(12) United States Patent
Inami et al.

(10) Patent No.: US 8,429,531 B2
(45) Date of Patent: Apr. 23, 2013

(54) OBJECT SELECTING APPARATUS, OBJECT SELECTING PROGRAM, INTEGRATED CIRCUIT USED FOR THE OBJECT SELECTING APPARATUS, AND OBJECT SELECTING METHOD

(75) Inventors: Satoshi Inami, Osaka (JP); Takashi Kawashima, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/997,119

(22) PCT Filed: Nov. 13, 2009

(86) PCT No.: PCT/JP2009/006076
§ 371 (c)(1),
(2), (4) Date: Dec. 9, 2010

(87) PCT Pub. No.: WO2010/095195
PCT Pub. Date: Aug. 26, 2010

(65) Prior Publication Data
US 2011/0296307 A1    Dec. 1, 2011

(30) Foreign Application Priority Data
Feb. 17, 2009    (JP) .................. 2009-033350

(51) Int. Cl.
*G06F 3/00* (2006.01)
(52) U.S. Cl.
USPC ......................................................... 715/719
(58) Field of Classification Search .................. 715/716, 715/719; 386/46, 68, 349; 345/716
See application file for complete search history.

(56) References Cited

U.S. PATENT DOCUMENTS

| 2002/0169749 | A1  | 11/2002 | Kageyama et al. |
| 2004/0012621 | A1* | 1/2004  | Kaneko et al. ................. 345/716 |
| 2005/0031315 | A1  | 2/2005  | Kageyama et al. |
| 2007/0009099 | A1  | 1/2007  | Kikuchi et al. |
| 2008/0253737 | A1* | 10/2008 | Kimura et al. .................. 386/68 |

FOREIGN PATENT DOCUMENTS

| JP | 2002-334092 | 11/2002 |
| JP | 2005-94788  | 4/2005  |
| JP | 2006-333189 | 12/2006 |
| JP | 2007-19769  | 1/2007  |
| JP | 2007-207191 | 8/2007  |
| JP | 2008-250654 | 10/2008 |

OTHER PUBLICATIONS

International Search Report issued Dec. 8, 2009 in corresponding International Application No. PCT/JP2009/006076.

* cited by examiner

*Primary Examiner* — Stephen Hong
*Assistant Examiner* — James G Pohlman
(74) *Attorney, Agent, or Firm* — Wenderoth, Lind & Ponack, L.L.P.

(57) ABSTRACT

In an object selecting apparatus for allowing a user to select an object in a video image: when the object sought to be selected by the user moves, the user selects the desired object intuitively and without feeling uncomfortable; an input operation from the user is received and anticipated paths of the respective objects are estimated based on path information occurring during the certain period of time prior to a point in time which is the start of a predetermined period of time before a time of receipt; and an appropriate object is determined as the object selected by the user when the anticipated position on the anticipated path, which corresponds to the time of receipt, is close to an inputted position.

16 Claims, 18 Drawing Sheets

| TIME | x | y |
|---|---|---|
| 00:01:06:10 | 800 | 333 |

(b)

| TIME | x | y |
|---|---|---|
| 00:01:06:10 | 800 | 333 |
| 00:01:06:20 | 803 | 331 |
| 00:01:06:30 | 808 | 328 |
| 00:01:06:40 | 811 | 325 |
| 00:01:06:50 | 806 | 330 |
| 00:01:06:60 | 801 | 331 |
| 00:01:06:70 | 798 | 333 |
| 00:01:06:80 | 796 | 337 |
| 00:01:06:90 | 801 | 339 |
| 00:01:07:00 | 804 | 331 |

(c)

| TIME | x | y |
|---|---|---|
| 00:01:15:30 | 360 | 730 |
| 00:01:15:40 | 490 | 690 |
| 00:01:15:50 | 615 | 615 |
| 00:01:15:60 | 710 | 550 |
| 00:01:15:70 | 800 | 505 |
| 00:01:15:80 | 810 | 410 |
| 00:01:15:90 | 830 | 480 |
| 00:01:16:00 | 870 | 515 |
| 00:01:16:10 | 900 | 540 |
| 00:01:16:20 | 930 | 567 |
| 00:01:16:30 | 961 | 586 |
| 00:01:16:40 | 974 | 602 |

| OBJECT | TABLE ADDRESS |
|---|---|
| VEHICLE A | 0X00000001 |
| VEHICLE B | 0X00001000 |
| ... | |

(b) TABLE ADDRESS: 0X00000001

| TIME | x | y |
|---|---|---|
| 00:01:05:00 | 240 | 810 |
| 00:01:05:10 | 350 | 720 |
| 00:01:05:20 | 480 | 680 |
| 00:01:05:30 | 610 | 610 |
| 00:01:05:40 | 710 | 550 |
| 00:01:05:50 | 800 | 505 |
| 00:01:05:60 | 810 | 410 |
| 00:01:05:70 | 800 | 333 |
| 00:01:05:80 | 780 | 211 |

(c) TABLE ADDRESS: 0X00001000

| TIME | x | y |
|---|---|---|
| 00:01:05:00 | 60 | 820 |
| 00:01:05:10 | 560 | 710 |
| 00:01:05:20 | 780 | 660 |
| 00:01:05:30 | 1150 | 590 |
| 00:01:05:40 | 680 | 540 |
| 00:01:05:50 | 205 | 510 |
| 00:01:05:60 | 350 | 405 |
| 00:01:05:70 | 550 | 225 |
| 00:01:05:80 | 790 | 111 |

FIG. 4
(a)
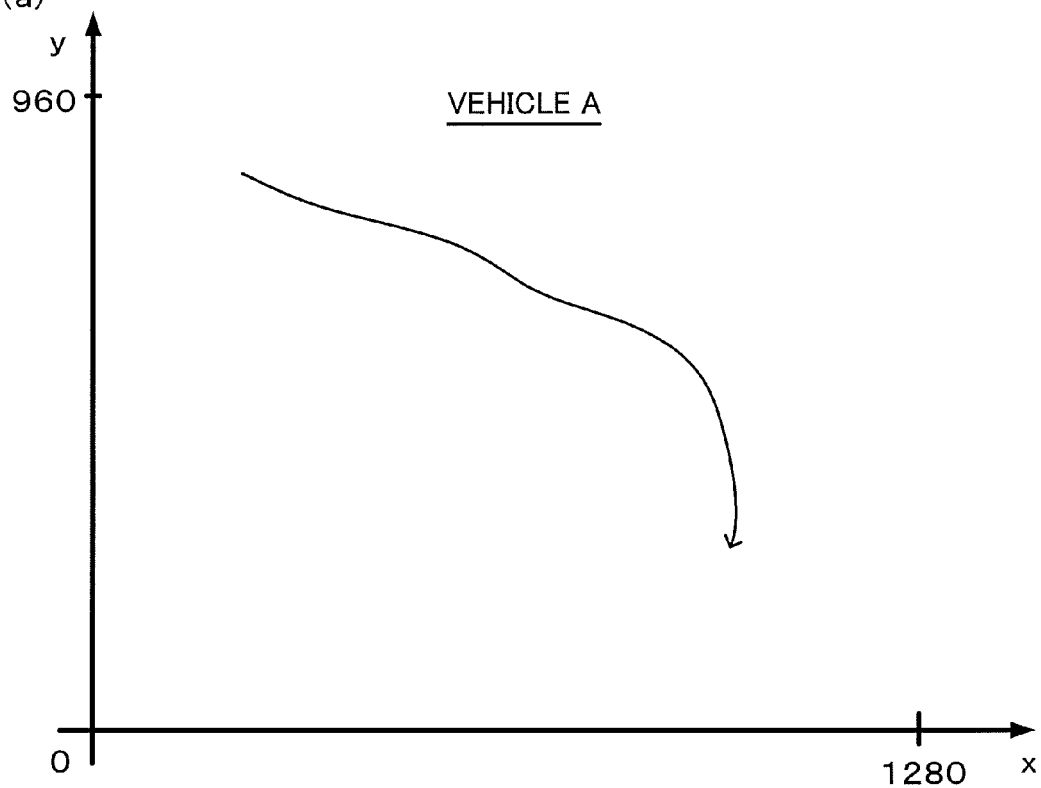
(b)
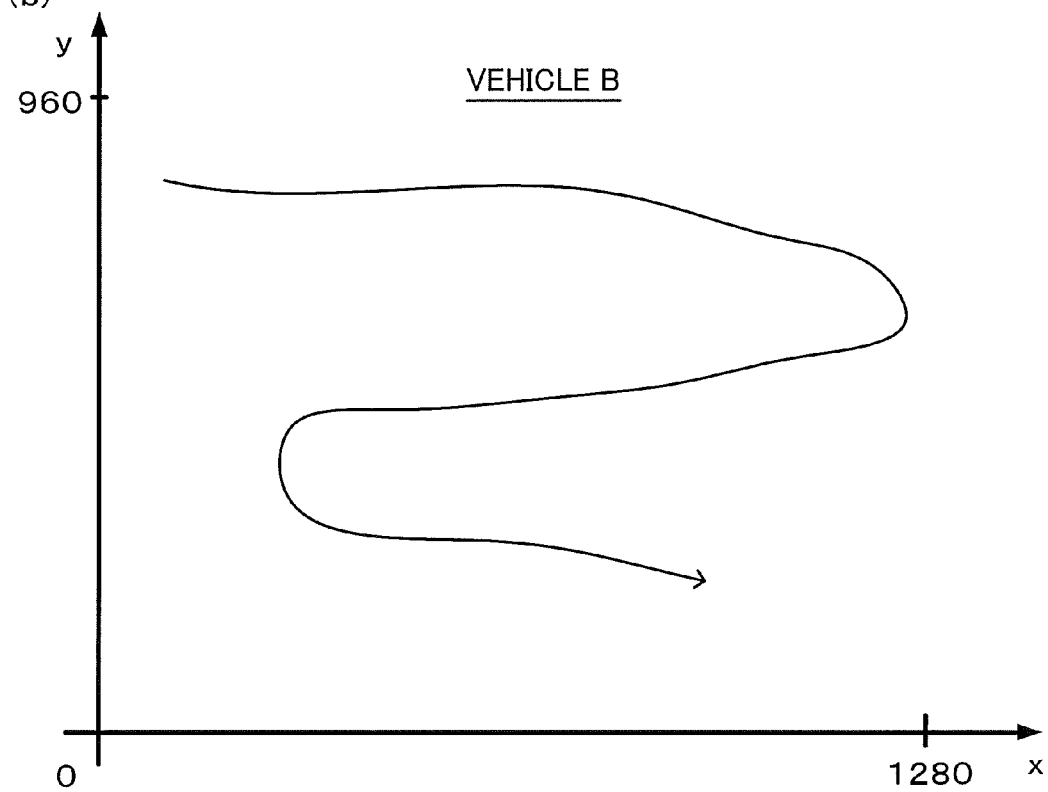

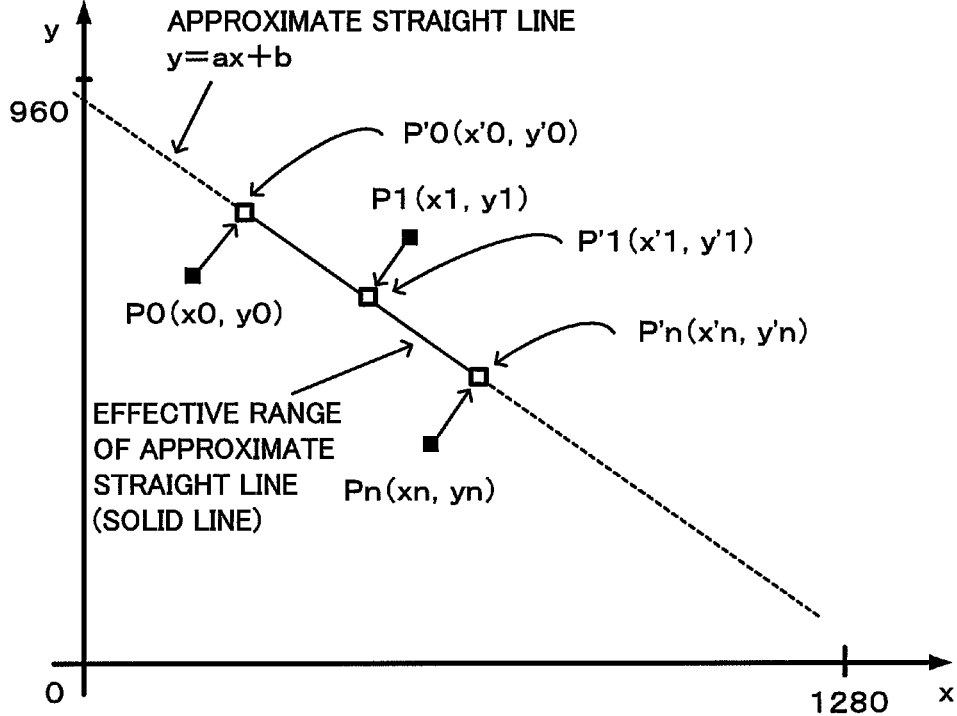
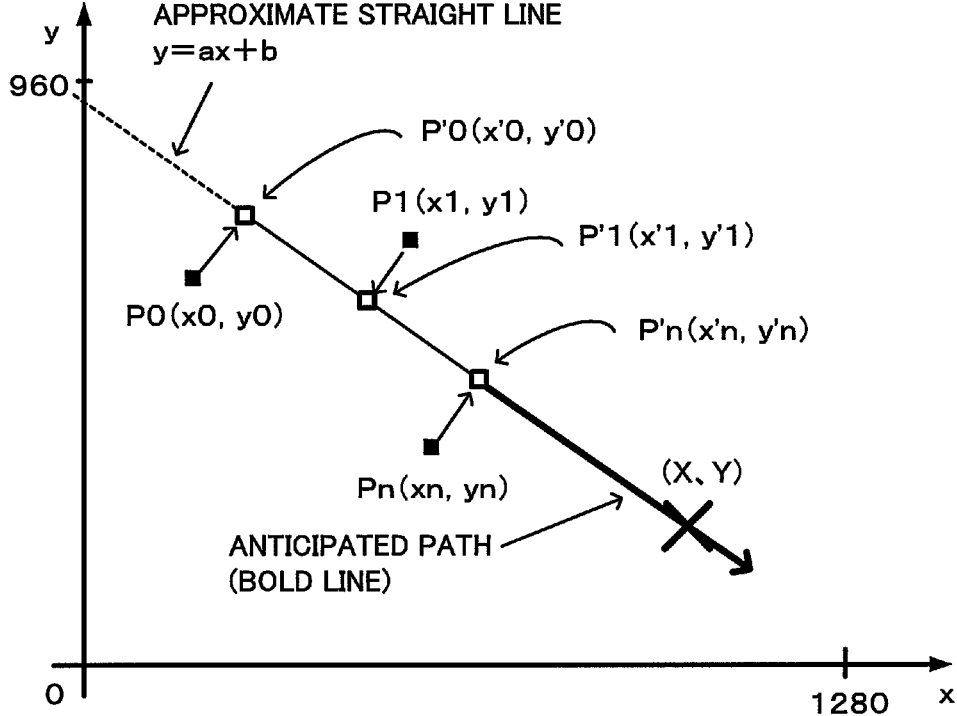

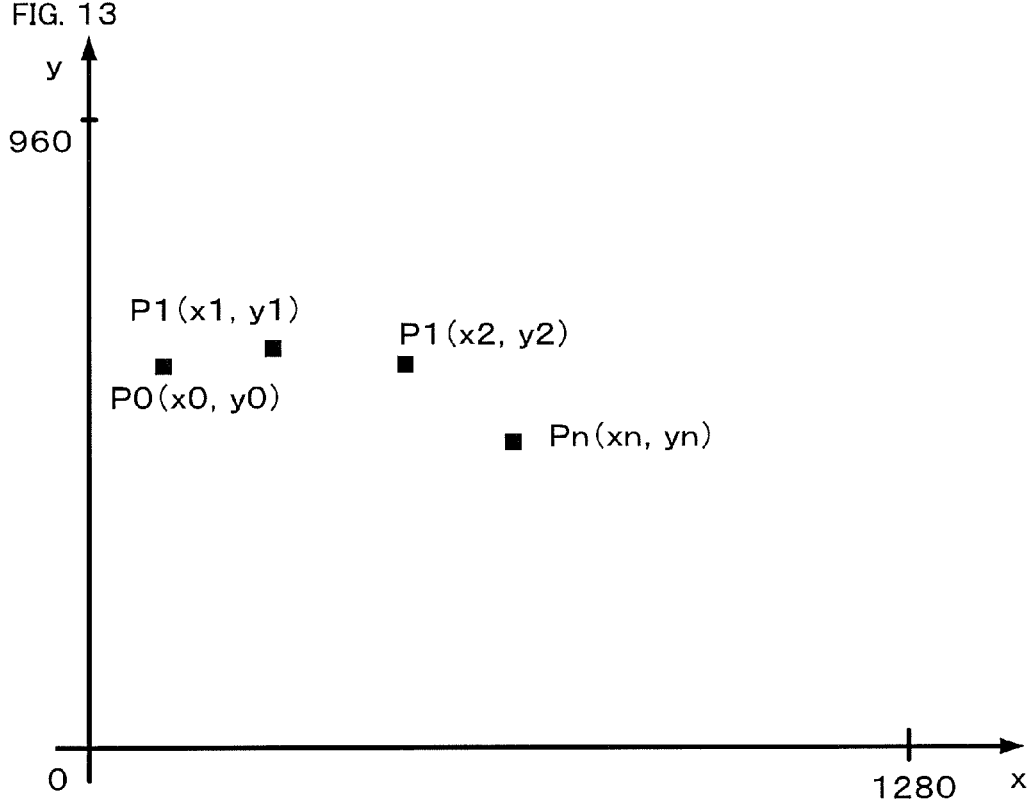
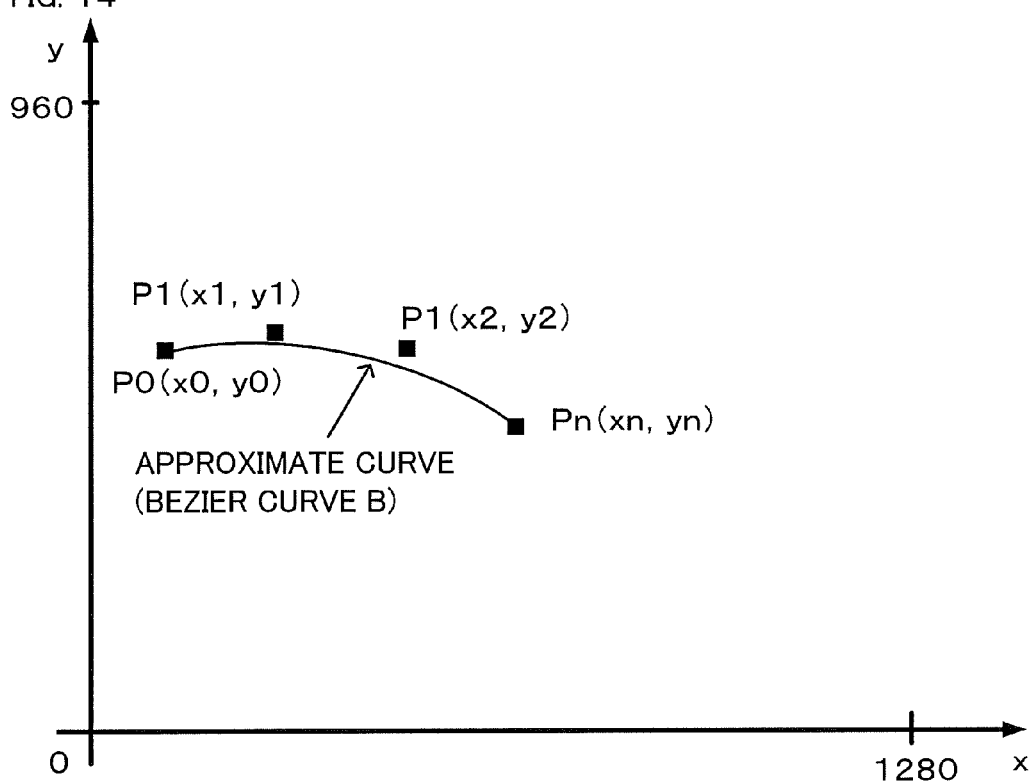

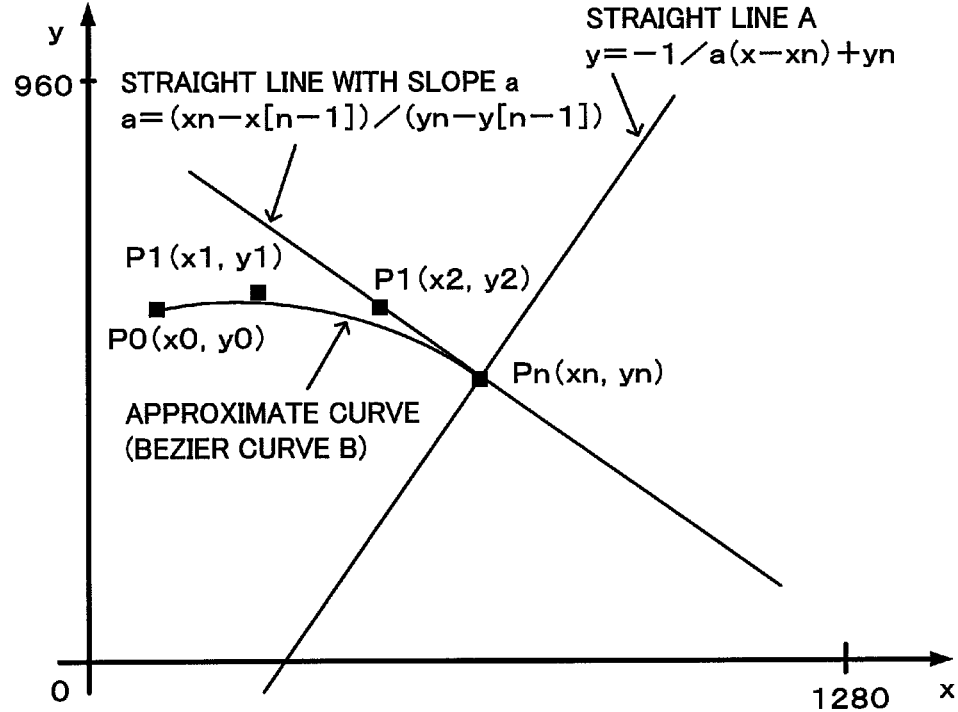
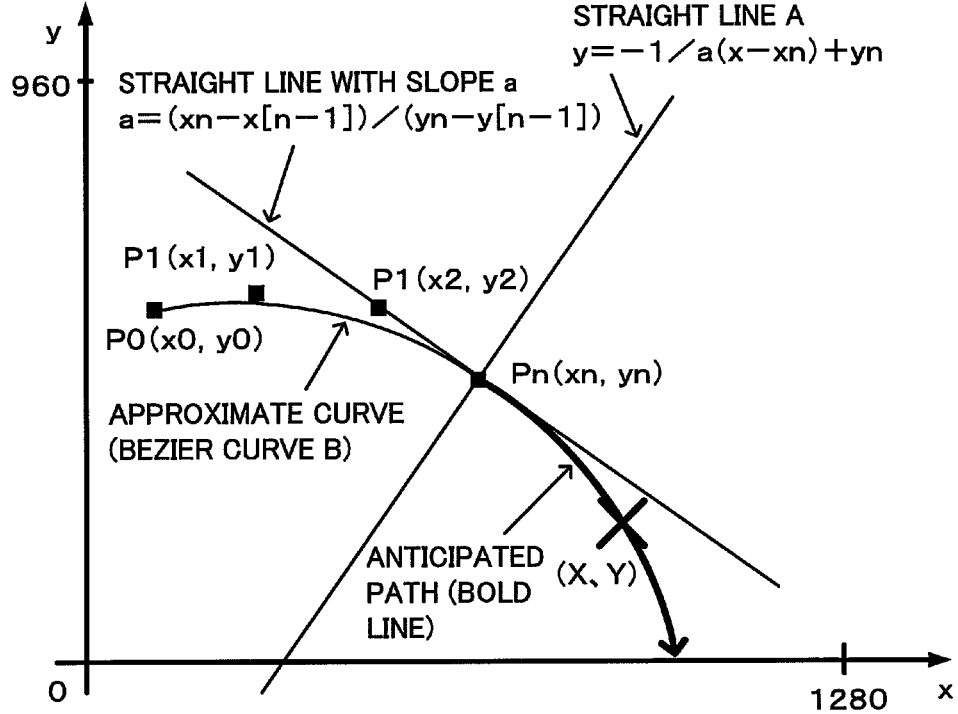

OBJECT SELECTING APPARATUS, OBJECT SELECTING PROGRAM, INTEGRATED CIRCUIT USED FOR THE OBJECT SELECTING APPARATUS, AND OBJECT SELECTING METHOD

TECHNICAL FIELD

The present invention relates to an object selecting apparatus having a function of allowing a user to select an object in a video image by using a pointing device or the like, and more particularly, to a technology for facilitating selection of an object which is moving.

BACKGROUND ART

In recent years, with regard to a display device such as a digital television, which displays broadcast video images, attention has been paid to highly useful functions such as allowing a user to select an object in a video image displayed on the screen by using a pointing device such as a touch panel or a mouse; searching a database for information relating to the selected object; and displaying the obtained information.

Patent Literature 1 discloses a conventional apparatus having the above described functions. An information browsing device 103 in Patent Literature 1 displays TV broadcast video images; obtains, when a user designates a desired point or area on a video image by using a mouse or the like, information about the point or area on the screen based on the user-designated point or area on the screen; obtains information such as a channel number and broadcasting hours from a TV tuner; and transmits these pieces of information to an information search device 109. The information search device 109, based on the information received from the information browsing device 103, searches a database 111 for related information and transmits the obtained related information to the information browsing device 103. The information browsing device 103 displays the received related information.

However, in the case where an object sought to be selected by a user is moves quickly, the user cannot follow the motion of the object, resulting in difficulty in selecting the desired object.

Patent Literature 2 discloses another conventional apparatus which solves the above problem. The apparatus disclosed in Patent Literature 2 searches a time range which includes a time range shortly before the time at which a user has operated a touch panel for selecting an object. Accordingly, even if the user has operated the touch panel not in time for the motion of the object, the user can select the object.

CITATION LIST

Patent Literature

[PTL 1] Japanese Laid-Open Patent Publication No. 2002-334092
[PTL 2] Japanese Laid-Open Patent Publication No. 2005-94788

SUMMARY OF THE INVENTION

Problems to be Solved by the Invention

However, according to the selecting method disclosed in the above Patent Literature 2, in order to select an object, it is necessary that the user intentionally does not follow the motion of the object and intentionally selects a position from which the object has moved away and where no object exists. Accordingly, the apparatus is not usable unless the user learns this unusual selecting method. Further, because of the time lag which occurs in this selecting method, the user feels uncomfortable and thus cannot use the apparatus intuitively and without feeling uncomfortable.

An object of the present invention is to provide an object selecting apparatus, an object selecting program, an integrated circuit used for the object selecting apparatus, and an object selecting method, which allow a user, when selecting a desired object displayed on a screen and when the object sought to be selected moves, to select the object intuitively and without feeling uncomfortable.

Solution to the Problems

The present invention is directed to an object selecting apparatus. To solve the above problems, the object selecting apparatus according to the present invention is an object selecting apparatus which allows a user to select an object in a video image, and which includes: a video processing section which causes an external display device to display a video image; a storage section which stores data of the video image caused to be displayed by the video processing section; an input section which receives an input operation by which the user attempts to designate a display position of an object in the video image displayed on the display device; an input analyzing section which generates, when the input operation is received by the input section, time information indicating a time of receipt and position information indicating an inputted position in the video image; a video analyzing section which extracts one or more objects in the video image based on the data of the video image stored in the storage section, which analyzes one or more paths of the respective one or more objects, and which generates, with respect to each of the one or more objects, path information indicating a path history of the object; and a determination section which, with respect to each of the one or more objects, estimates a anticipated path, which the user would anticipate after a point in time which is the start of a predetermined period of time before the time of receipt indicated by the time information outputted by the input analyzing section, based on the path information occurring during a certain period of time prior to the point in time which is the start of the predetermined period of time; and determines the object as the object selected by the user when a anticipated position on the anticipated path, which anticipated position corresponds to the time of receipt, is close to the inputted position indicated by the position information generated by the input analyzing section.

Preferably, the determination section generates, with respect to each of the one or more objects, an approximate straight-line of a path of the object based on the path information occurring during the certain period of time; extends the approximate straight-line in the moving direction of the object; and determines the extended portion as the anticipated path.

Preferably, the determination section determines, with respect to each of the one or more objects, whether the distances between positions on the approximate straight-line and respective positions of the object in the path history exceed a predetermined limit value; and only when the distances do not exceed the limit value, estimates the anticipated path based on the approximate straight-line.

Preferably, the determination section calculates, with respect to each of the one or more objects, when the distances exceed the limit value, an approximate curve for the object based on the path information occurring during the certain period of time; extends the approximate curve in the moving direction of the object; and determines the extended portion as the anticipated path.

Preferably, the determination section calculates, with respect to each of the one or more objects, when the distances exceed the limit value, an approximate curve for the object based on the path information occurring during the certain period of time; extends the approximate curve in the moving direction of the object at the same curvature as the approximate curve; and determines the extended portion as the anticipated path.

Preferably, the determination section detects, with respect to each of the one or more objects, when the distances exceed the limit value, a moving pattern of the object based on the path information occurring during the certain period of time; anticipates a path of the object after the point in time which is the start of the predetermined period of time based on the moving pattern; and determines the path having been anticipated as the anticipated path.

Preferably, the determination section calculates, with respect to each of the one or more objects, the moving speed of the object based on the path information occurring during the certain period of time; and determines, as the anticipated position, the position to which the object has moved during the predetermined period of time from the position at the point in time which is the start of the predetermined period of time, while maintaining the constant speed based on the moving speed of the object.

Preferably, the determining section calculates, with respect to each of the one or more objects, the rate of change of speed of the object based on the path information occurring during the certain period of time; and determines, as the anticipated position, the position to which the object has moved during the predetermined period of time from the position at the point in time which is the start of the predetermined period of time, while changing the speed based on the rate of change of speed.

Preferably, the object selecting apparatus further includes: a presentation section which, when the determination section has determined one or more objects as the object designated by the user, presents one or more candidate objects for selection, and urges the user to select one or more from among the one or more candidate objects; a selection receiving section which receives, from the user, a selection of the one or more from among the one or more candidate objects presented by the presentation section; and an execution section which executes a predetermined process with respect to each of the one or more of which selection has been received by the selection receiving section, and which causes the external display device to display a result of the process.

The present invention is directed to a program used in an object selecting apparatus. To solve the above problems, the program used in the object selecting apparatus according to the present invention causes the object selecting apparatus to execute: a video processing step of causing an external display device to display a video image; a storing step of storing data of the video image caused to be displayed in the video processing step; an inputting step of receiving an input operation by which the user attempts to designate a display position of an object in the video image displayed on the display device; an input analyzing step of generating, when the input operation is received in the inputting step, time information indicating a time of receipt and position information indicating an inputted position in the video image; a video analyzing step of extracting one or more objects in the video image based on the data of the video image stored in the storing step, of analyzing one or more paths of the respective one or more objects, and of generating, with respect to each of the one or more objects, path information indicating a path history of the object; and a determination step of, with respect to each of the one or more objects, estimating a anticipated path, which the user would anticipate after a point in time which is the start of a predetermined period of time before the time of receipt indicated by the time information outputted in the input analyzing step, based on the path information occurring during a certain period of time prior to the point in time which is the start of the predetermined period of time; and determining the object as the object selected by the user when a anticipated position on the anticipated path, which anticipated position corresponds to the time of receipt, is close to the inputted position indicated by the position information generated in the input analyzing step.

The present invention is directed to an integrated circuit used in an object selecting apparatus. To solve the above problems, the integrated circuit used in the object selecting apparatus according to the present invention functions as: a video processing section which causes an external display device to display a video image; a storage section which stores data of the video image caused to be displayed by the video processing section; an input section which receives an input operation by which the user attempts to designate a display position of an object in the video image displayed on the display device; an input analyzing section which generates, when the input operation is received by the input section, time information indicating a time of receipt and position information indicating an inputted position in the video image; a video analyzing section which extracts one or more objects in the video image based on the data of the video image stored in the storage section, which analyzes one or more paths of the respective one or more objects, and which generates, with respect to each of the one or more objects, path information indicating a path history of the object; and a determination section which, with respect to each of the one or more objects, estimates a anticipated path, which the user would anticipate after a point in time which is the start of a predetermined period of time before the time of receipt indicated by the time information outputted by the input analyzing section, based on the path information occurring during a certain period of time prior to the point in time which is the start of the predetermined period of time; and determines the object as the object selected by the user when a anticipated position on the anticipated path, which anticipated position corresponds to the time of receipt, is close to the inputted position indicated by the position information generated by the input analyzing section.

The present invention is directed to an object selecting method. To solve the above problems, the object selecting method according to the present invention includes: a video processing step of causing an external display device to display a video image; a storing step of storing data of the video image caused to be displayed in the video processing step; an inputting step of receiving an input operation by which the user attempts to designate a display position of an object in the video image displayed on the display device; an input analyzing step of generating, when the input operation is received in the inputting step, time information indicating a time of receipt and position information indicating an inputted position in the video image; a video analyzing step of extracting one or more objects in the video image based on the data of the video image stored in the storing step, of analyzing one or more paths of the respective one or more objects, and of generating, with respect to each of the one or more objects, path information indicating a path history of the object; and a determination step of, with respect to each of the one or more objects, estimating a anticipated path, which the user would anticipate after a point in time which is the start of a predetermined period of time before the time of receipt indicated by the time information outputted in the input analyzing step, based on the path information occurring during a certain period of time prior to the point in time which is the start of the predetermined period of time; and determining the object as the object selected by the user when a anticipated position on the anticipated path, which anticipated position corresponds to the time of receipt, is close to the inputted position indicated by the position information generated in the input analyzing step.

Advantageous Effects of the Invention

As described above, in an object selecting apparatus according to the present invention for allowing a user to select an object in an image displayed on a screen, in the case where the object sought to be selected by the user moves in the screen, an input operation from the user is received; anticipated paths of respective objects are estimated based on path information occurring during a certain period of time prior to the point in time which is the start of the predetermined period of time before the time of receipt of input operation; and the object can be determined as the object which the user has designated, when a anticipated position on a anticipated path, which anticipated position corresponds to the time of receipt of input operation, is close to an inputted position. Accordingly, it is possible to estimate the position at which the user would anticipate the object would be based on the past path of the object which the user might have seen, and regardless of the actual position of the object at the time of the input operation performed by the user, to correctly select the object which the user has attempted to select.

BRIEF DESCRIPTION OF THE DRAWINGS

FIG. 2 shows diagrams illustrating an example of groups containing input position information and input time information, the groups being generated and managed by an input analyzing section 15.

FIG. 3 shows diagrams illustrating an example of object path information generated by a video analyzing section 16.

(a) of FIG. 4 is a diagram illustrating an outline of an object path of a "vehicle A" which is shown in FIG. 3 as an example, and (b) of FIG. 4 is a diagram illustrating an outline of an object path of a "vehicle B" which is shown in FIG. 3 as an example.

Figure 5:
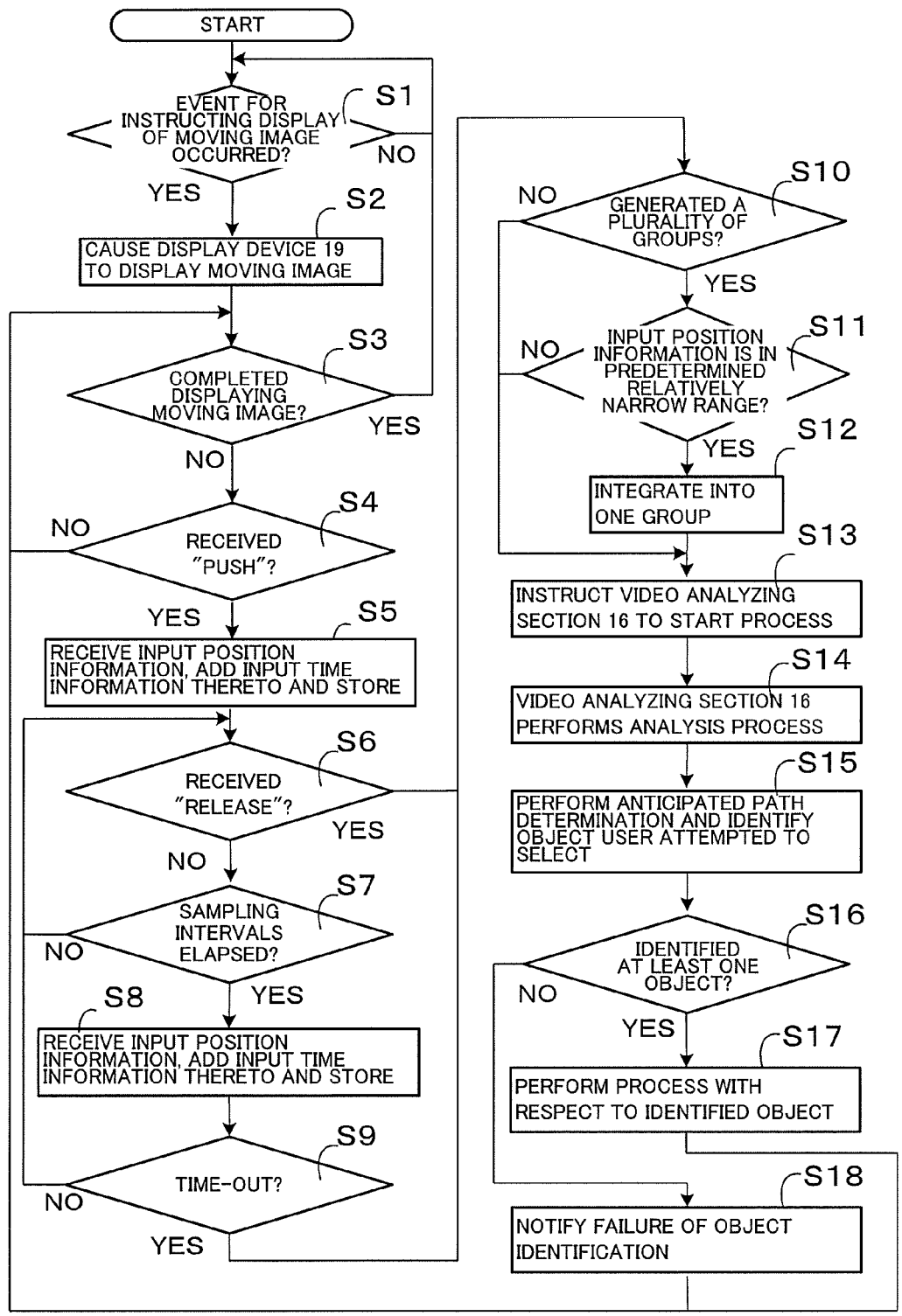

FIG. 5 is a diagram illustrating a procedure of an object selecting process performed in the object selection executing system 1 according to the present embodiment.

Figure 6:
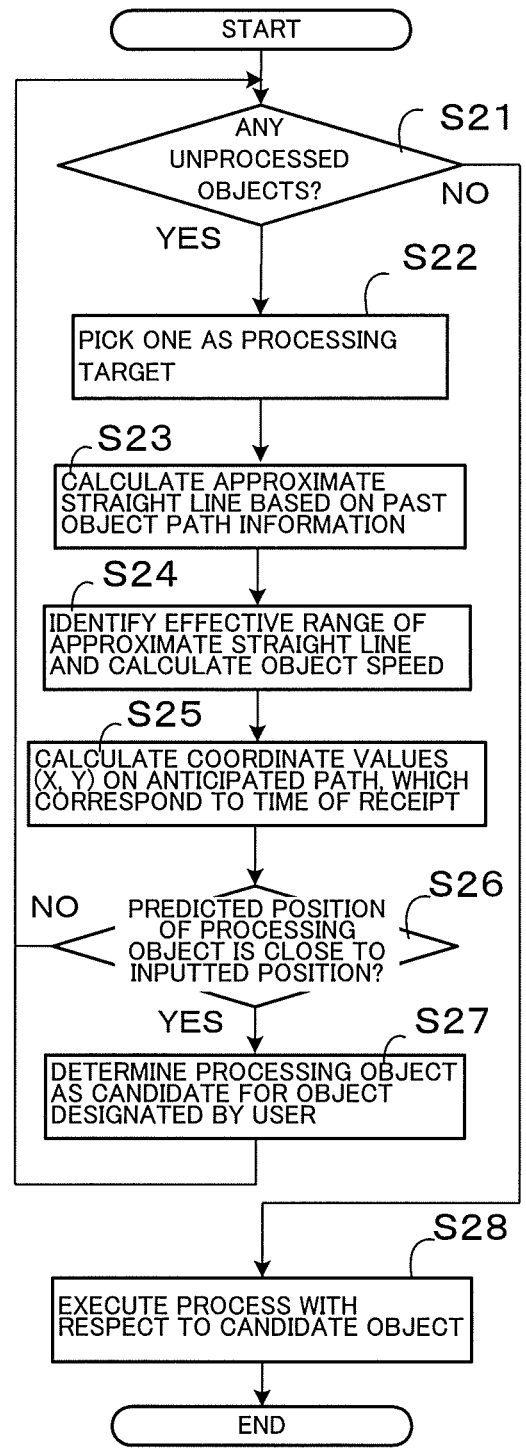

FIG. 6 is a diagram illustrating a procedure of a determination algorithm which includes a process of estimating an anticipated path performed in a determination section 17.

Figure 7:
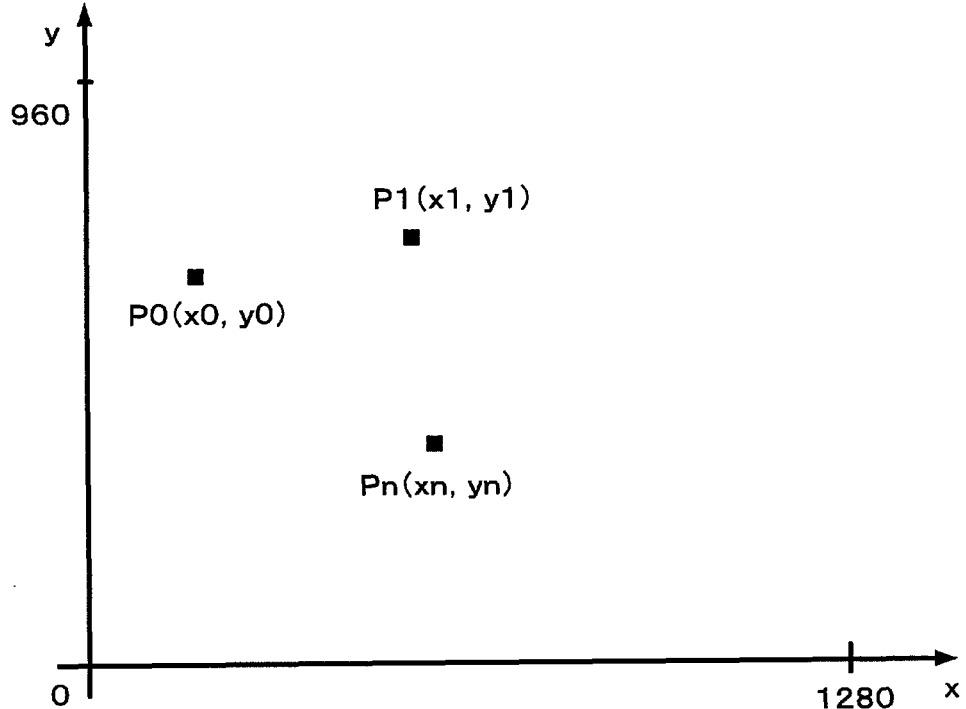

FIG. 7 is diagram illustrating an outline of a process of obtaining an approximate straight-line of a path of an object.

Figure 8:
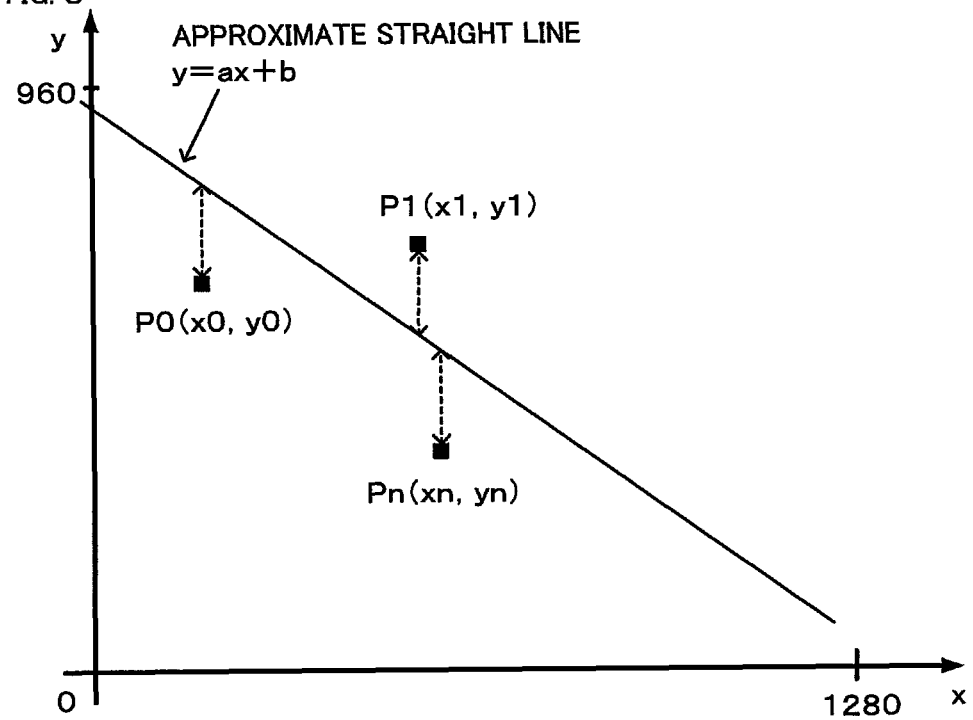

FIG. 8 is a diagram illustrating an outline of the process of obtaining the approximate straight-line of the path of the object.

FIG. 9 is a diagram illustrating an outline of the process of obtaining the approximate straight-line of the path of the object.

FIG. 10 is a diagram illustrating an outline of the process of obtaining the approximate straight-line of the path of the object.

Figure 11:
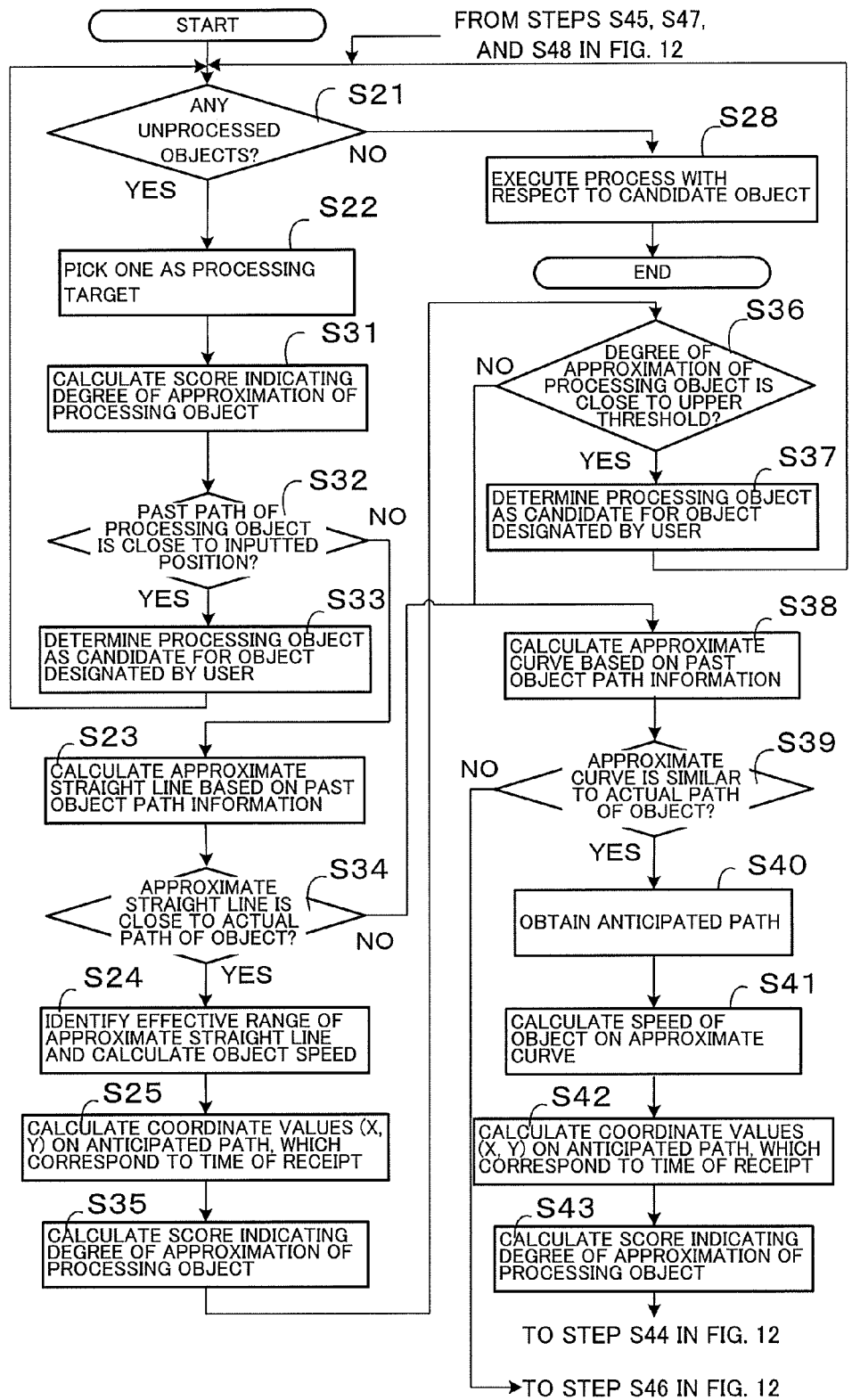

FIG. 11 is a diagram illustrating the former part of the procedure of the determination algorithm which includes a process of estimating an anticipated path performed in the determination section 17.

Figure 12:
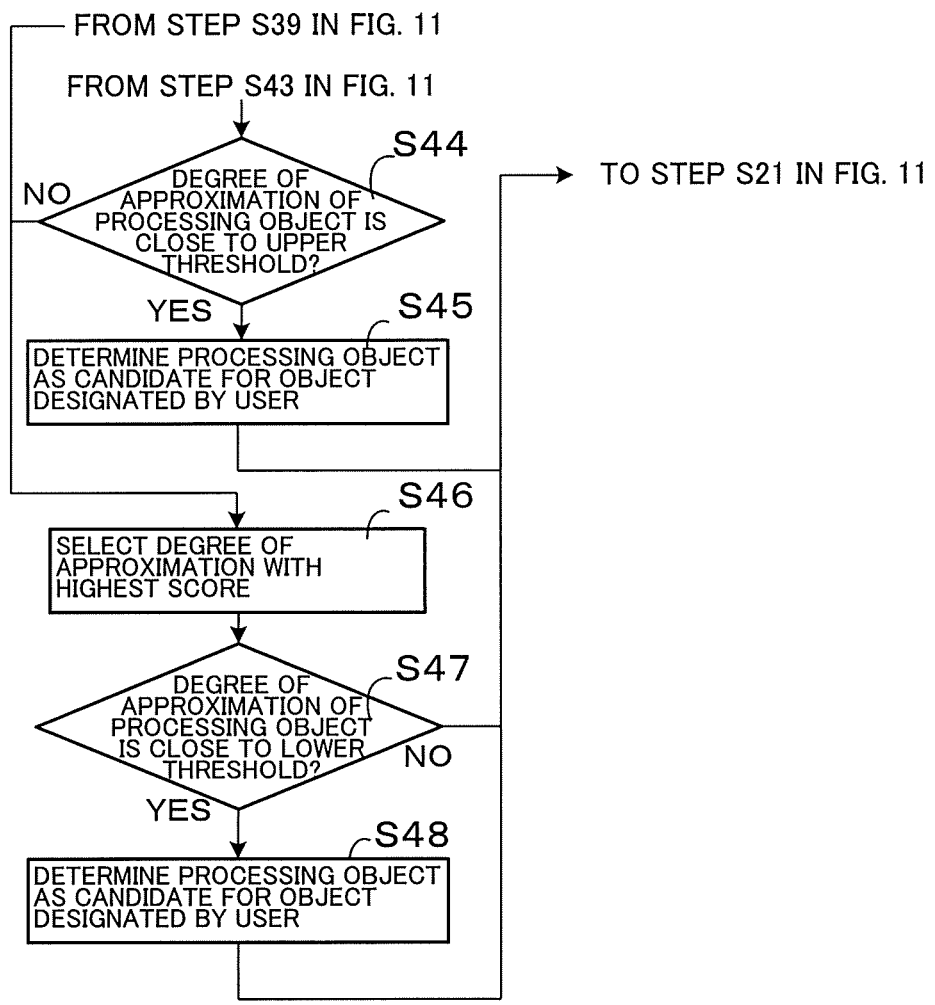

FIG. 12 is a diagram illustrating the latter part of the procedure of the determination algorithm which includes the process of estimating the anticipated path performed in the determination section 17.

FIG. 13 is a diagram illustrating an outline of a process of obtaining an approximate curve of a path of an object.

FIG. 14 is a diagram illustrating an outline of the process of obtaining the approximate curve of the path of the object.

FIG. 15 is a diagram illustrating an outline of the process of obtaining the approximate curve of the path of the object.

FIG. 16 is a diagram illustrating an outline of the process of obtaining the approximate curve of the path of the object.

Figure 17:
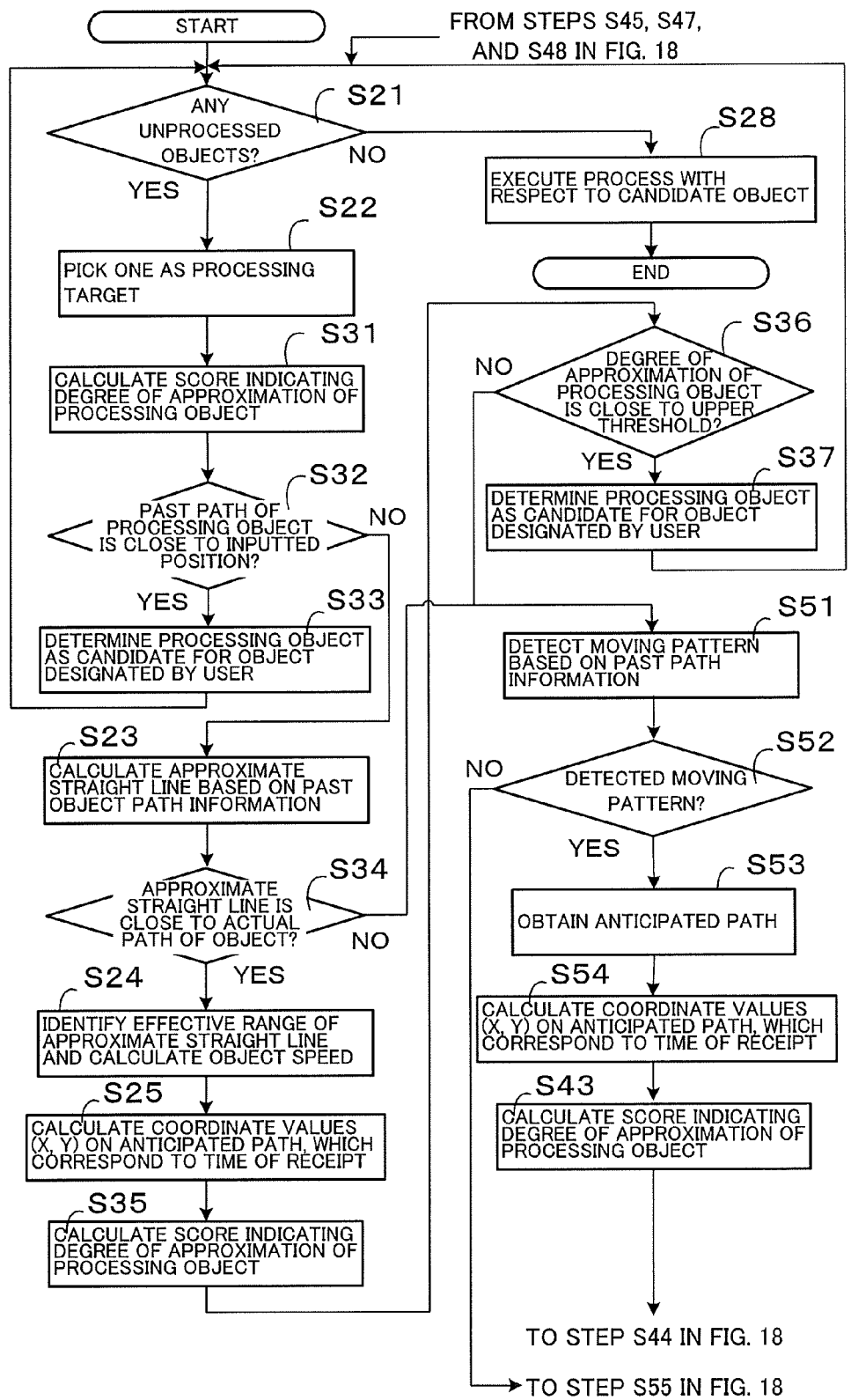

FIG. 17 is a diagram illustrating the former part of the procedure of the determination algorithm which includes a process of estimating an anticipated path performed in the determination section 17.

Figure 18:
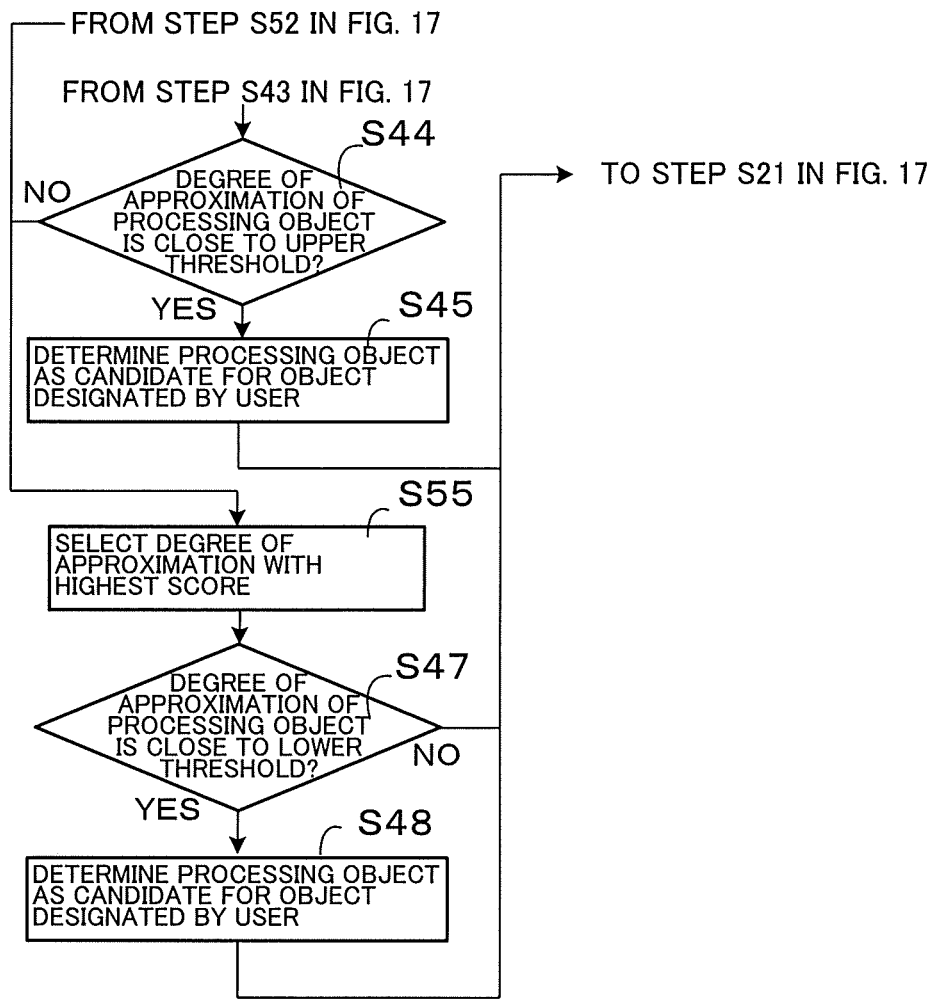

FIG. 18 is a diagram illustrating the latter part of the procedure of the determination algorithm which includes the process of estimating the anticipated path performed in the determination section 17.

Figure 19:
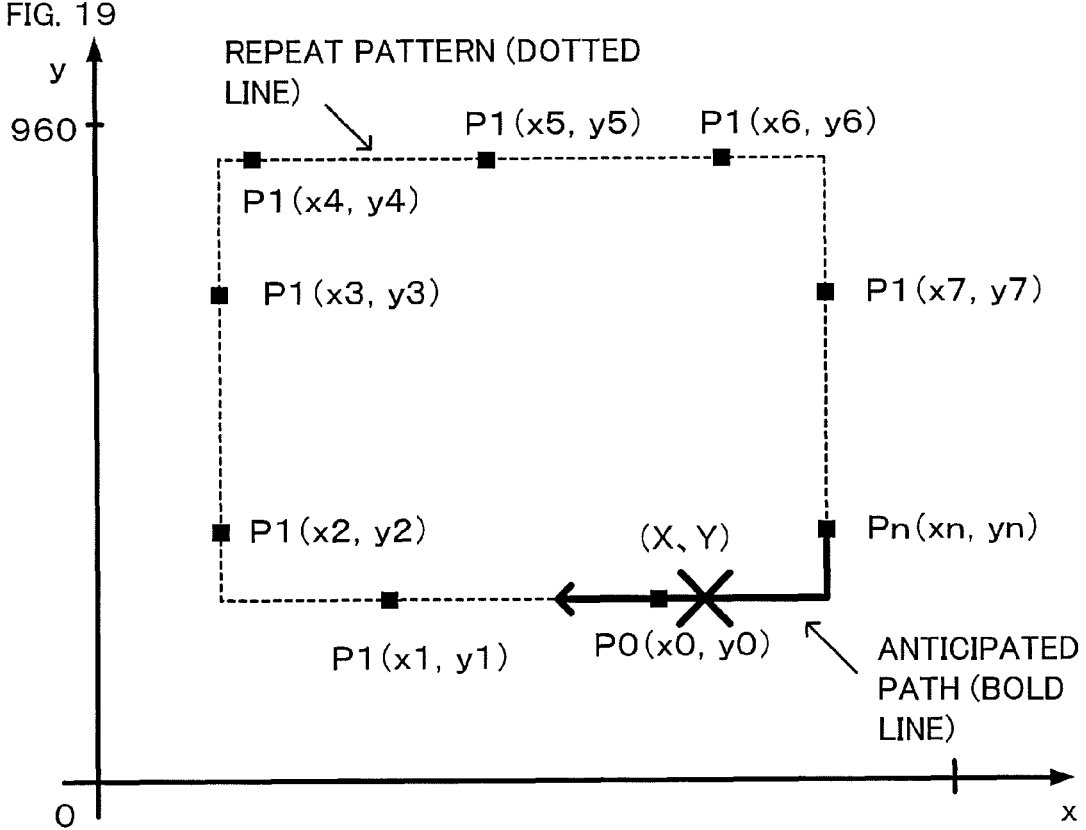

FIG. 19 is a diagram illustrating an outline of a process of detecting a moving pattern based on the path of an object.

Figure 20:
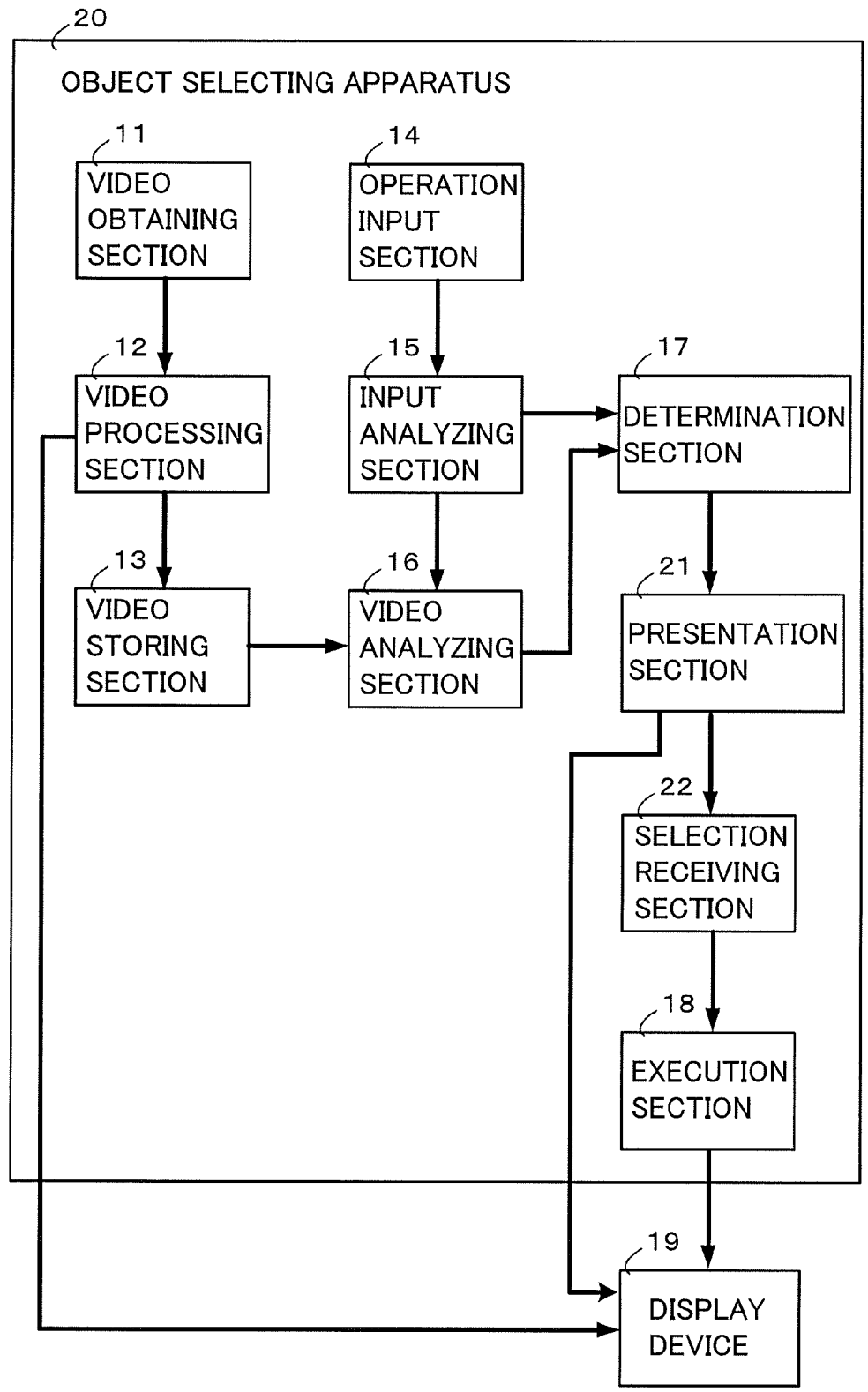

FIG. 20 is a diagram illustrating an outline of an object selection executing system 2 according to a second embodiment.

Figure 21:
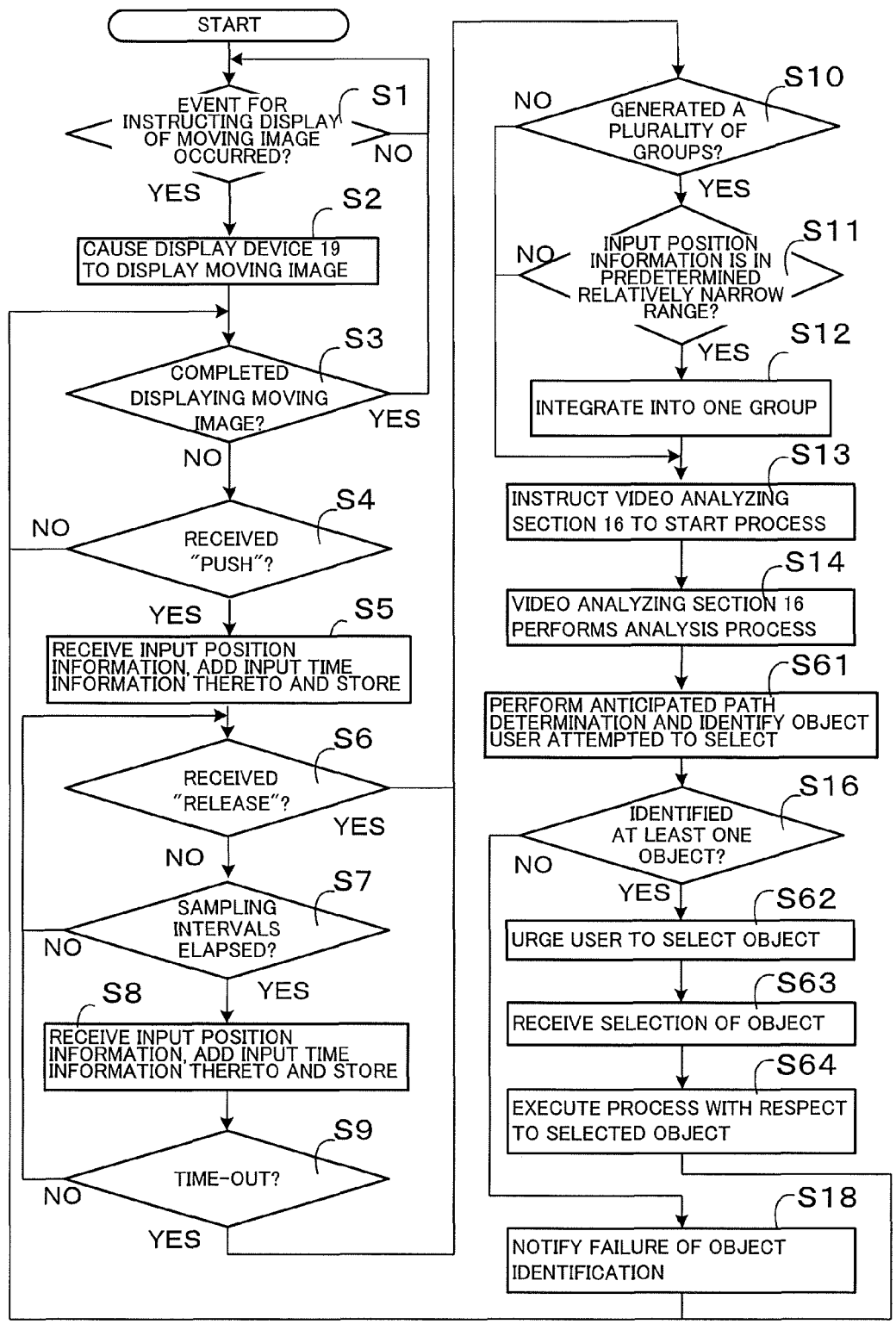

FIG. 21 is a diagram illustrating a procedure of an object selecting process performed in the object selection executing system 2 according to the present embodiment.

Figure 22:
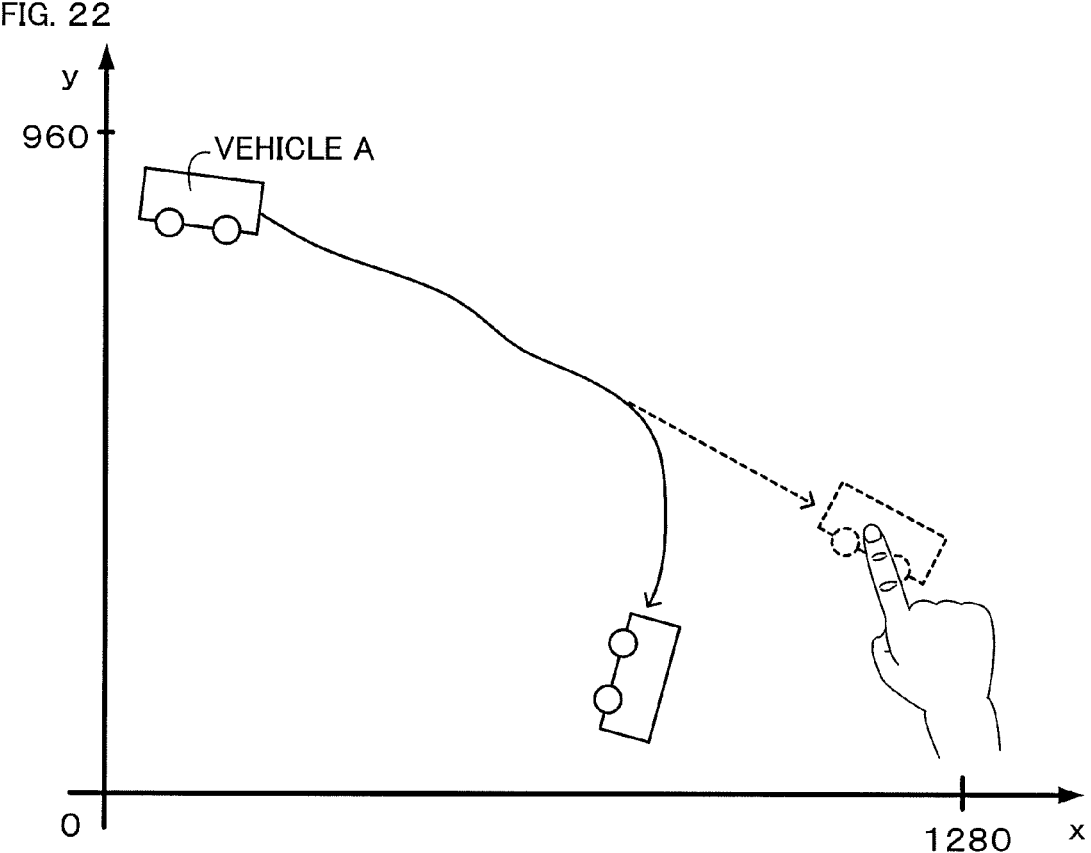

FIG. 22 is a diagram illustrating a case where a user has anticipated a motion of the vehicle A and touched a touch panel.

DESCRIPTION OF EMBODIMENTS

First Embodiment

<Outline>

The present embodiment is applied to a system which executes predetermined processes such as allowing a user to select an object in a video image displayed on a screen; searching for information relating to the selected object; and displaying the obtained related information. In this system, when the object sought to be selected by the user moves in the screen, the user designates a position on the screen by, for example, clicking with a mouse. In such a case, the present embodiment estimates, based on the path of the object during a predetermined period of time prior to the time of the input, the position at which the user would anticipate the object would be based on the past path; and selects the object whose estimated position coincides with the designated position inputted by the user. Accordingly, the user can select the desired object intuitively and without feeling uncomfortable:

<Configuration>

Figure 1:
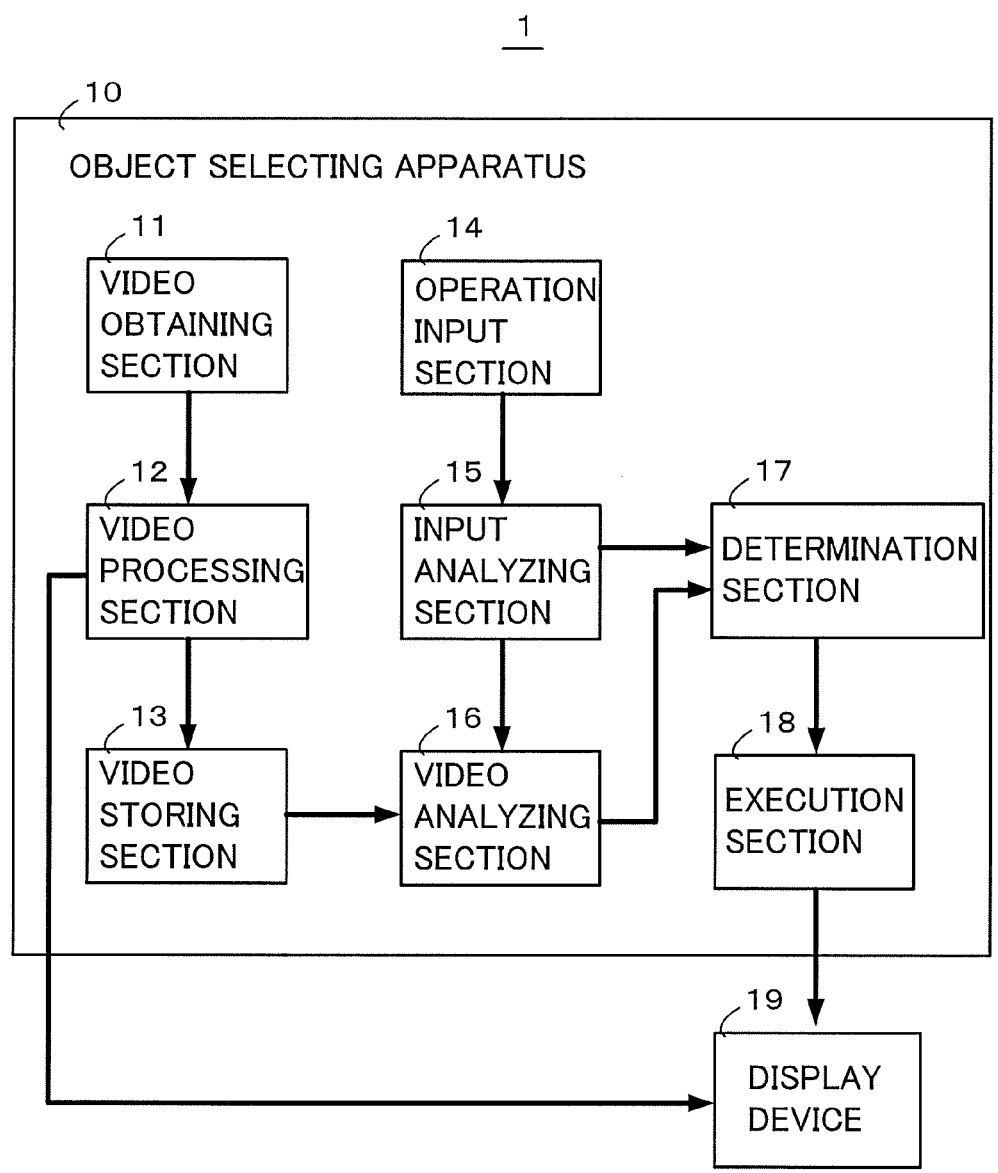
FIG. 1 is a diagram illustrating an outline of an object selection executing system 1 according to a first embodiment.

FIG. 1 is a diagram illustrating an outline of an object selection executing system 1 according to a first embodiment.

The object selection executing system 1 shown in FIG. 1 includes an object selecting apparatus 10 and a display device 19.

Referring to FIG. 1, the object selecting apparatus 10 is an apparatus which allows the user to select an object in a video image displayed on a screen of the display device 19; and executes a predetermined process with respect to the selected object. The object selecting apparatus 10 includes a video obtaining section 11, a video processing section 12, a video storing section 13, an operation input section 14, an input analyzing section 15, a video analyzing section 16, a determination section 17, an execution section 18, and an interface (not shown) for connecting with the display device 19.

Here, the object selecting apparatus 10 may be a dedicated device which includes the functions of the present embodiment, or may be a multifunction apparatus which also includes functions of another device such as: a mobile device having a communication function such as a mobile phone or a mobile information terminal; an imaging device such as a digital camera or a video camera; a television receiver which receives a broadcast wave of a video image to reproduce and display the broadcast video image; or an information device such as a personal computer.

The display device 19, which is a display device such as a liquid crystal display, a CRT display, or an organic light emitting display, is connected via the interface to the object selecting apparatus 10 and displays a video image, a pointer of a pointing device, and the like.

The video obtaining section 11 obtains video contents which are received from a broadcast wave or read from a packaged media such as a DVD.

The video processing section 12, as necessary, decodes the video contents obtained by the video obtaining section 11, converts the video contents to video data formatted to be displayed by the display device 19, and outputs the video data to the display device 19 and causes the display device 19 to display a video image. Further, the video processing section 12 outputs the video data having been outputted to the display device 19, to the video storing section 13 so as to be stored therein.

The video image to be displayed on the display device 19 may be any kind of image where an object moves on the screen. Examples of such an image include: an image of a program broadcasted on television; a reproduced image of a package media such as a video tape or a DVD; a reproduced image of data downloaded from a network; and an image controlled by a program. Further, the video image to be displayed on the display device 19 may be a live image based on real time input from a video camera or the like.

To the video content obtained by the video obtaining section 11, meta-information is added. The meta-information associates position information of an object in the image and the time of image reproduction of the image, which have been obtained from the video content. The meta-information is not necessarily directly added to the video content. For example, the meta-information may be included in a package of the video content separately from the video content, or may be downloaded from a network.

The video storing section 13 temporarily stores the video data outputted from the video processing section 12 and retains the video data containing data of at least a predetermined period of time, which video/data may be used by the video analyzing section 16 even after the video processing section 12 has caused the display device 19 to display the video data as video images.

The operation input section 14, which includes a connecting interface for connecting with a pointing device such as a touch panel or a mouse, receives an input operation by which the user attempts to designate, by using the connected pointing device, a display position of an object in the video image displayed on the display device 19; and notifies the input analyzing section 15 of operation information and input position information indicating coordinates with respect to the input operation. Specifically, the operation input section 14 notifies the input analyzing section 15 of, for example, operation information "(Push)" indicating a start of an input and its operation time when the user has touched the touch panel or pressed the button of the mouse; and operation information "Release" indicating the end of the input when the user has released his/her finger from the touch panel or released the button of the mouse. Further, the operation input section 14 sequentially notifies the input analyzing section 15 of the input position information indicating coordinates where the touch panel is being touched or coordinates where the pointer is being displayed, at least while the user is touching the touch panel or pressing the button of the mouse.

The input analyzing section 15, which receives the operation information and the input position information from the operation input section 14, generates, at predetermined sampling intervals during a period of time between the time of receiving the operation information "Push" and the time of receiving the operation information "Release," a group containing the received input position information and input time information indicating a time of receipt of input operation, and manages the generated group. In the present embodiment, the sampling interval is 0.1 seconds. The input analyzing section 15 determines, when it has generated a plurality of groups, whether the input position information contained in the plurality of groups is in a predetermined relatively narrow range. Then, the input analyzing section 15 determines, if it has determined that the input position information contained in the plurality of groups is in the predetermined relatively narrow range, that the coordinates represented by the position information substantially coincide with the position designated by the user and selects a representative group (for example, a group which contains the input time information indicating the earliest time); or integrates the plurality of groups into one group by averaging the input position information and averaging the input time information contained in the plurality of groups. The input analyzing section 15 determines, when it has generated a plurality of groups and when it has determined that the input position information contained in the plurality of groups is not in the predetermined relatively narrow range, that the coordinates do not substantially coincide with the position designated by the user, and thus does not integrate the plurality of groups into one group.

(a) to (c) of FIG. 2 are diagrams illustrating an example of groups containing the input position information and the input time information, the groups being generated and managed by the input analyzing section 15. Sets of two digits in a "time" column respectively correspond to, starting from the left, hours, minutes, seconds, and 1/100 seconds. These sets of two numbers indicate a relative time based on the time when reproduction of a video image being displayed started. For example, "00:01:06:10" corresponds to 0 o'clock 1 minute 6.1 seconds. The description of the input time information in the "time" column may be uniquely defined in the system.

A description in an "x" column indicates a coordinate value representing the right/left position when the leftmost side of an image is zero and the rightmost side of the image is 1280. A description in a "y" column indicates a coordinate value representing the up/down position when the downmost side of the image is zero and the upmost side of the image is 960.

Referring to (a) of FIG. 2, when only one group has been generated by, for example, a quick single click on the mouse by the user or a tap on the touch panel by the user, this group is used without change. (b) of FIG. 2 illustrates a case where a plurality of groups have been generated by, for example, a slow single click on the mouse by the user, or a touch on one point of the touch panel by the user, which touch is released after a certain period of time, and input position information contained in the plurality of the groups is in a predetermined relatively narrow range. In this case, variations among "x" coordinate values and variations among "y" coordinate values are both within "50," which is the predetermined relatively narrow range, and thus these coordinate values are determined to indicate substantially the same position. Accordingly, the plurality of groups are integrated into one group as in the manner shown in (a) of FIG. 2. (c) of FIG. 2 illustrates a case where a plurality of groups have been generated by, for example, a drag of the mouse by the user, or a slide operation on the touch panel by the user, which slide operation is released after a certain period of time, and input position information contained in the plurality of groups is not in the predetermined relatively narrow range. In this case, the variations among "x" coordinate values and the variations among "y" coordinate values are not within "50," which is the predetermined relatively narrow range, and thus these coordinate values are determined not to indicate substantially the same position. Accordingly, the plurality of groups are used without being integrated.

The input analyzing section 15 sends the generated one or plurality of groups containing the input position information and the input tune information to the determination section 17. On receipt of a valid input, the input analyzing section 15 instructs the video analyzing section 16 to start a process. It is noted that, when the instruction is given, the input time information contained in the generated one or a plurality of groups may be attached so that an accurate range of time to which video data corresponds is specified, the video data being the processed by the video analyzing section 16. The instruction to start the process may be given to the video analyzing section 16 by, instead of the input analyzing section 15, another component such as the operation input section 14 or the determination section 17.

On receipt of the instruction to start the process, the video analyzing section 16 reads video data having been displayed in a past predetermined period of time from the video storing section 13; extracts from the video data one or more objects which may be selected by the user; and generates object path information indicating a path of each of the extracted one or more objects. The object path information is time-series data indicating the positions of an object in chronological order. Specifically, the object path information is a collection of groups containing object time information which is time information of an object at each of respective predetermined sampling timings, and object position information indicating a position at which the object is displayed at each of the respective sampling timings.

More specifically, the video analyzing section 16 first analyzes the video data; extracts one or more objects in the video data from the meta-information attached to the video content; and obtains object position information and object time information of each of the extracted objects. Further, the video analyzing section 16 can, for example, retain in advance information of objects to be identified and extract the objects from the image by pattern matching or time like in an image identifying process.

(a) to (c) of FIG. 3 are diagrams illustrating an example of the object path information generated by the video analyzing section 16.

In (a) of FIG. 3, there are two objects, a "vehicle A" and a "vehicle B." For the "vehicle A" and the "vehicle B," a table address indicated in (b) of FIG. 3 and a table address indicated in (c) of FIG. 3 are retained respectively. Each of the table addresses indicates a storage area in which corresponding object path information is stored. Descriptions in columns, "time," "x," and "y" are provided in the same manner as in FIG. 2.

(a) of FIG. 4 is a diagram illustrating an outline of an object path of the "vehicle A" which is shown in FIG. 3 as an example, and (b) of FIG. 4 is a diagram illustrating an outline of an object path of the "vehicle B" which is shown in FIG. 3 as an example.

The video analyzing section 16, when it has generated the object path information, sends the object path information to the determination section 17. When, for example, the video analyzing section 16 has been unable to generate the object path information, resulting in no object path information, the video analyzing section 16 notifies the determination section 17 of the result.

Based on the one or more groups containing the input position information and the input time information received from the input analyzing section 15 and on the object path information received from the video analyzing section 16, the determination section 17 performs anticipated path determination by using a single determination algorithm or a combination of determination algorithms; identifies the object which the user has attempted to select; and sends a determination result to the execution section 18.

For example, one determination algorithm compares, with respect to each of the one or more objects, based on the object path information received from the video analyzing section 16, an actual past path of the object with the input position information received from the input analyzing section 15. Then, if the actual past path of the object is in a predetermined range from the input position information and thus is close to the input position information, the object is identified as the object designated by the user.

In another example, a determination algorithm estimates, with respect to each of the one or more objects, based on the object path information occurring during a certain period of time prior to the predetermined period of time before the time of receipt of input operation represented by the input time information received from the input analyzing section 15 contained in the object path information having been received from the video analyzing section 16, a anticipated path, on which the user would anticipate that the object might be displayed at around the time of receipt of input operation. Then, the another determination algorithm compares the anticipated path with the input position information. If the anticipated path is in the predetermined range from the input position information and thus is close to the input position information, the object is identified as the object designated by the user.

The method of estimating the anticipated path will be described in detail below.

When a plurality of objects have been determined to meet requirements to be selected, in accordance with a priority set in advance, the highest priority object may be selected or one or more objects, such as the top three objects, may be selected. Alternatively, all the objects that meet the requirements to be selected may be sent to the execution section 18. Still alternatively, instead of selection in order of a priority, in accordance with the degree of coincidence calculated based on the requirements to be selected, one or more objects with higher degrees of coincidence may be selected.

On receipt of a determination result, the execution section 18 performs a process with respect to each of the one or more objects, which has been determined by the determination section 17 as the object which the user has attempted to select. For example, the execution section 18 instructs the video processing section 12 to visually change the object by changing the color of the object, causing the object to blink, changing the size of the object, and the like. Further, for example, the execution section 18 accesses a network by using address information previously associated with the object and obtains, from outside the apparatus, information relating to the object; and instructs an external device or the video processing section 12 to cause the display device 19 to display the related information. Further, for example, the execution section 18 executes a program associated with the selected object. The information to be displayed on the display device 19 may be character data of object information or a URL where detailed information of the object can be obtained. The user can access the information shown on the URL displayed on the display device 19 and obtain the detailed information relating to the object. The execution section 18 may be a separate external device.

<Operation>

FIG. 5 is a diagram illustrating a procedure of the object selecting process in the object selection executing system 1 according to the present embodiment.

(1) The process waits for an occurrence of an event for instructing display of a video image, such as an operation of giving a viewing instruction or the like by a user (step S1).

(2) On the occurrence of the event for instructing the display of the video image (Yes in step S1), the video processing section 12 outputs the video data which the video processing section 12 has generated to the display device 19 and causes the display device 19 to display the video image (step S2).

(3) It is determined whether the display device 19 has completed displaying the video image (step S3). If the display device 19 has completed displaying the video image, the process returns to (step S1) to wait for an occurrence of an event for instructing display of a video image.

(4) If the display device 19 has not completed displaying the video image (No in step S3), the process waits for the input analyzing section 15 to receive input operation information "Push" from the operation input section 14 (step S4).

(5) The input analyzing section 15, when it has received the operation information "Push" from the operation input section 14 (Yes in step S4), subsequently receives input position information from the operation input section 14, and stores the received input position information after adding its input time information thereto (step S5).

(6) The process waits for the input analyzing section 15 to receive operation information "Release" from the operation input section 14 (step S6).

(7) If the input analyzing section 15 has not received the operation information "Release" (No in step S6), it is determined whether sampling intervals have elapsed (step S7).

(8) If the sampling intervals have elapsed before the input analyzing section 15 receives the operation information "Release" (Yes in step S7), the input analyzing section 15 receives input position information from the operation input section 14, and stores the received input position information after adding its input time information thereto (step S8).

(9) It is determined whether a time-out has occurred (step S9). In the present embodiment, the time-out period is set to 2 seconds. Instead of determining the occurrence of the time-out, the number of generated groups may be counted to determine whether the number has reached a predetermined number. The predetermined number here is set to 20. Alternatively, no determination may be performed on the occurrence of the time-out or on the number of the generated groups.

(10) If the operation information "Release" has been received (Yes in step S6) or the time-out has occurred (Yes in step S9), it is determined whether a plurality of groups have been generated by the input analyzing section 15 (step S10).

(11) If the plurality of groups have been generated (Yes in step S10), the input analyzing section 15 determines whether the input position information contained in the plurality of groups is in the predetermined relatively narrow range (step S11). In the present embodiment, it is determined whether both of variations among "x" coordinate values and variations among "y" coordinate values are within "50."

(12) If the input position information contained in the plurality of groups is in the predetermined relatively narrow range (Yes in step S11), the input analyzing section 15 integrates the plurality of groups into one group (step S12). In the present embodiment, only the earliest group is retained and the rest of the groups are deleted.

(13) The input analyzing section 15 sends the generated one or more groups containing the input position information and the input time information to the determination section 17, and instructs the video analyzing section 16 to start a process (step S13). Here, the input time information contained in the generated one or more groups is attached to the instruction given to the video analyzing section 16 to start the process.

(14) On receipt of the instruction to start the process, the video analyzing section 16 obtains, from the video storing section 13, the video data which corresponds to the video image having been displayed, and starts to analyze the obtained video data. More specifically, the video analyzing section 16 obtains, from meta-information contained in video contents obtained by the video obtaining section 11, object path information indicating a path of each object during the certain period of time prior to the predetermined period of time before the time represented by the input time information included in the instruction, and sends the obtained object path information to the determination section 17. If there is no object path information, the video analyzing section 16 notifies the determination section 17 of the result (step S14). In the present embodiment, the video analyzing section 16 obtains the object path information of each object during one second starting from one second prior to a point in time 0.5 seconds before the time represented by the input time information, and sends the obtained object path information to the determination section 17.

(15) Based on the one or more groups containing the input position information and the input time information received from the input analyzing section 15 and based on the object path information received from the video analyzing section 16, the determination section 17 performs anticipated path determination by using a single determination algorithm or a combination of determination algorithms; identifies the object which the user has attempted to select; and sends the determination result to the execution section 18 (step S15). The determination section 17 performs no operation in this example if it has received a notice that there is no object path information from the video analyzing section 16.

(16) It is determined whether at least one object has been identified as the object which the user has attempted to select (step S16).

(17) If at least one object has been identified (Yes in step S16), the execution section 18 performs a process with respect to the object(s) identified by the determination section 17 (step S17).

(18) If no object has been identified (No in step S16), an error message or the like is displayed to indicate the failure of object identification (step S18).

<Detailed Description of a Method 1 for Estimating a Anticipated Path>

A method 1 for estimating a anticipated path performed in the determination section 17 will be described below.

In the method 1 for estimating the anticipated path, an approximate straight-line is calculated based on past object path information and extended in the moving direction of the object, and the extended portion is determined as the anticipated path.

FIG. 6 is a diagram illustrating a procedure of the determination algorithm which includes a process of estimating the anticipated path performed in the determination section 17, the process corresponding to a subroutine of step S15 in the procedure of the object selecting process in FIG. 5.

(1) It is determined whether there are any unprocessed objects (step S21).

(2) If there are any unprocessed objects, the determination section 17 selects one of the unprocessed objects as a processing target (step S22).

(3) The approximate straight-line is calculated based on the past object path information (step S23).

Here, the approximate straight-line is calculated with respect to the certain period of time prior to the point in time shortly before the time of receipt of input operation represented by the input time information. In the present embodiment, the approximate straight-line is calculated with respect to a period of time of one second starting from one second prior to a point in time 0.5 seconds before the time of receipt. It is noted that, if the object moves in an excessively wide range during this period of time of one second, it is highly probable that the approximate straight-line cannot be obtained. Accordingly, if the amount of movement exceeds, for example, an amount corresponding to coordinate values differing by "500" in either the x-axis direction or the y-axis direction, the approximate straight-line may be calculated with respect to points within the range corresponding to the amount corresponding to the coordinate values differing by "500."

FIGS. 7 to 10 are diagrams illustrating an outline of a process of obtaining the approximate straight-line of the path of the object.

As shown in FIG. 7, it is assumed that the object path information occurring during the target time period of calculation consists of the points, "P0, P1, ..., Pn." Based on these coordinate values, "(x0, y0), (x1, y1), ..., (xn, yn)," an approximate straight-line "y=ax+b" is calculated by the least squares method. Here, a and b are constant numbers.

The least squares method is a method of obtaining an approximate straight line which minimizes a sum of squares of errors between the respective approximate values and the measured values.

Accordingly, when the approximate straight-line is represented by "y=ax+b," the approximate straight-line "y=ax+b" is calculated by using the formula below.

$$\Sigma(yi-axi-b)^2 \quad \text{(Formula 1)}$$

The approximate straight-line "y=ax+b" is calculated by obtaining values of a and b when the value of the formula above is a minimum.

(Formula 1) is a function of many variables with variables, a and b.

The function of many variables takes a minimum value when all partial differential coefficients concurrently become 0. (Formula 1) can be calculated by using this characteristic. First, partial differentiation is performed with respect to a and b, and by assigning the measured values to these partial differentiation equations, a simultaneous equation to obtain coefficients of the approximate straight-line is derived. Then, by solving the simultaneous equation with a matrix calculation or the like, a and b can be obtained. Accordingly, the approximate straight-line "y=ax+b" as shown in FIG. 8, can be obtained.

(4) As shown in FIG. 9, perpendiculars are drawn from the respective constituent points to the approximate straight-line "y=ax+b," and the respective constituent points are replaced with the points "P'0 (x'0, y'0), P'1 (x'1, y'1), ..., P'n (x'n, y'n)" on the approximate straight-line. Then, an effective range (P'0 to P'n) of the approximate straight-line is determined and the speed of the object on the approximate straight-line is calculated (step S24). For example, when calculating an average speed, a difference (x'10-x'0, y'10-y'0) between coordinate values (x'10, y'10) which corresponds to the point representing 0.5 seconds before the time of receipt of input operation and coordinate values (x'0, y'0) which corresponds to the point representing 1.5 seconds before the time of receipt of input operation is obtained. Then, the speed per second can be obtained by calculating a root-mean-square with respect to the x component and the y component, and dividing the result by an elapsed time (1.5 seconds-0.5 seconds=1 second, in this case) (Formula 2 below).

$$\sqrt{\{(x'10-x'0)^2+(y'10-y'0)^2\}}/1[\text{dot/second}(\text{dot}/s)] \quad \text{(Formula 2)}$$

(5) Referring to FIG. 10, the extended portion drawn straight in the moving direction of the object from the effective range (P'0 to P'n) of the obtained approximate straight-line is determined as a anticipated path (thick line in FIG. 10). Then, by using the obtained speed, coordinate values (X, Y) on the anticipated path, which correspond to the time of receipt of input operation, are calculated (step S25). For example, the distance between: the point on the anticipated path, which corresponds to the point 0.5 seconds before the time of receipt of input operation; and the point on the anticipated path which corresponds to the point of the time of receipt of input operation, is equivalent to half of the difference (x'10-x'0, y'10-y'0). Accordingly, the coordinate values on the anticipated path which correspond to the time of receipt of input operation can be calculated by (Formula 3) below.

$$(x'10+(x'10-x'0)/2, y'10+(y'10-y'0)/2) \quad \text{(Formula 3)}$$

When calculating the speed of the object in step S24, the effective range of the approximate straight-line may be divided into a plurality of sections, and the speeds in the respective sections may be calculated. Then, based on the calculated respective speeds, the rate of change of speed may be calculated. Further, when calculating the coordinate values which correspond to the time of receipt of input operation in step S25, by using the rate of change of speed calculated in step S24, the position to which the object has moved during a predetermined period of time while changing speed may be determined as a anticipated position.

(6) The calculated coordinate values on the anticipated path which correspond to the time of receipt of input operation, are compared with the input position information received from the input analyzing section 15. Then, it is determined whether the distances between the coordinate values on the anticipated path and the respective positions indicated by the respective input position information are in a predetermined range and accordingly, in close proximity to each other (step S26). For example, if at least one of the straight line distances therebetween are shorter than the distance corresponding to a difference in coordinate values of 50, then the distances are determined to be in the predetermined range.

(7) When the distances therebetween have been determined to be in the predetermined range (Yes in step S26), the object which is being processed is determined as a candidate for the object designated by the user (step S27), and the process proceeds to the next object (step S21).

When the distances therebetween have been determined to be not in the predetermined range (No in step S26), 110 further operation is performed and the process proceeds to the next object (step S21).

(8) When all of the objects have been processed (No in step S21), information of the candidate(s) for the object designated by the user is sent as a determination result to the execution section 18. The execution section 18 performs a process with respect to the candidate object(s) (step S28). When there is only one candidate object, the execution section 18 executes the process with respect to the one candidate object. When there are a plurality of candidate objects, the execution section 18 may execute the process with respect to all of the plurality of candidate objects, or may cause the candidate objects to be displayed in an order from the nearest to the farthest with respect to the input position with their images and urge the user to select from among the candidate objects.

In the present embodiment, the calculated approximate straight-line is always used for estimating a anticipated path without being evaluated for how close it is to the actual path of the object. However, the anticipated path may be estimated only when an evaluation result of the degree of approximation of the calculated approximate straight-line and the path of the actual object is relatively good. For example, based on the determination results of whether the distances between positions on the calculated approximate straight-line and the respective positions of the object in the past object path information exceed a predetermined limit value, only when none exceeds the limit value or when the average does not exceed the limit value, the approximate straight-line may be used for estimating the anticipated path.

[First Modification]

The present modification is another example of the method of estimating the anticipated path performed in the determination section 17 according to the first embodiment and the determination algorithm which includes the process of estimating the anticipated path performed in the determination section 17 according to the first embodiment.

<Detailed Description of a Method 2 for Estimating the Anticipated Path>

A method 2 for estimating the anticipated path performed in the determination section 17 will be described below.

In the method 2 for estimating the anticipated path, the approximate straight-line is calculated based on the past object path information, and the effectiveness of the approximate straight-line is evaluated. Only when the effectiveness has been verified, the approximate straight-line is extended straight in the moving direction of the object, and the extended portion is determined as the anticipated path in a manner similar to that in the method 1 according to the first embodiment. When the effectiveness has not been verified, an approximate alive is calculated based on the past object path information. Then, the approximate curve is extended in the moving direction of the object, and the extended portion is determined as the anticipated path.

In the above determination algorithm according to the first modification, past path determination based on the past path of the object is performed before the anticipated path determination. When no appropriate object is found, the anticipated path determination based on the approximate straight-line is performed, and further the anticipated path determination based on the approximate curve is performed.

FIGS. 11 and 12 are diagrams illustrating a procedure of a determination algorithm which includes a process of estimating a anticipated path performed in the determination section 17, the procedure corresponding to the subroutine of step S15 in the procedure of the object selecting process shown in FIG. 5. Those steps which perform the processes similar to those in FIG. 6 of the first embodiment, are denoted by the same step numbers, and detailed descriptions thereof are omitted.

(1) to (2) Processes similar to those described in (1) to (2) referring to FIG. 6 are performed (steps S21 to S22).

(3) The past object path information is compared with the input position information received from the input analyzing section 15, and based on the distance between the past object path and the input position, a score indicating the degree of approximation of the object is calculated (step S31). For example, when distances between all possible pairs of a plurality of past positions of the object and one or more input positions are calculated and the shortest distance with respect to an object a is Za, the degree of approximation Pa is represented by the following formula.

$$Pa=100/(Za+1) \quad \text{(Formula 4)}$$

In (Formula 4), the farther the past position of the object is from the input position, the closer the score indicating the degree of approximation is to 0, while the closer the past position of the object is from the input position, the closer the score indicating the degree of approximation is to 100.

Alternatively, a temporal element may be added to (Formula 4).

For example, when a time represented by the input time information is T0, and a time at which the distance with respect to the object a is the shortest distance Za, is Ta, the degree of approximation Pa is represented by the following formula.

$$Pa=(100/(Za+1))/(|Ta-T0|+1) \quad \text{(Formula 5)}$$

In (Formula 5), the farther the past position and time of the object are from the input position and time, the closer the score indicating the degree of approximation is to 0, while the closer the past position and time of the object is from the input position and time, the closer the score indicating the degree of approximation is to 100.

(4) The calculated degree of approximation is compared with an upper threshold value, and it is determined whether the past path of the object is close to the input position (step S32). For example, when the score indicating the degree of approximation is greater than or equal to 70, it is determined that the past path of the object is close to the input position.

(5) When it has been determined that the past path of the object is close to the input position (Yes in step S32), the object which is the processing target is determined as a candidate for the object designated by the user (step S33), and the process proceeds to the step for the next object (step S21).

(6) When it has been determined that the past path of the object is not close to the input position (No in step S32), processes similar to those described in (3) referring to FIG. 6 are performed (step S23).

(7) It is determined whether the calculated approximate straight-line is similar to the actual path of the object (step S34). For example, based on the determination results of whether the distances between positions on the calculated approximate straight-line and the respective positions of the object in the past object path information exceed a predetermined limit value, only when none exceeds the limit value or when the average does not exceed the limit value, the calculated approximate straight-line is determined to be similar to the actual path of the object.

When the calculated approximate straight-line is not similar to the actual path of the object, the process proceeds to anticipated path determination based on an approximate curve (step S38).

(8) to (9) When the calculated approximate straight-line is similar to the actual path of the object, (No in step S32), processes similar to those described in (4) to (5) referring to FIG. 6 are performed (steps S24 to S25).

(10) The calculated coordinate on the anticipated path which corresponds to the time of receipt of input operation is compared with the input position information received from the input analyzing section 15, and based on the distance between the coordinate values of the coordinate on the anticipated path and the input position, the score indicating the degree of approximation of the object is calculated (step S35). The method for calculating the score indicating the degree of approximation is similar to that in the description of step S31.

(11) By comparing the calculated degree of approximation with an upper threshold value, it is determined whether these are close to each other (step S36). For example, if the score indicating the degree of approximation is greater than or equal to 60, it is determined that the calculated degree of approximation is close to the upper threshold value.

(12) When it has been determined that the calculated degree of approximation is close to the upper threshold value (Yes in step S36), the object which is the processing target is determined as a candidate for the object designated by the user (step S37), and the process proceeds to the step for the next object (Step S21).

(13) When it has been determined that the calculated degree of approximation is not close to the upper threshold value (No in step S36), the approximate curve is calculated from the past object path information (step S38).

Here, the approximate curve is calculated with respect to the certain period of time prior to the point in time shortly before the time of receipt of input operation represented by the input time information. In the present modification, the approximate curve is calculated with respect to a period of time of one second starting from one second prior to a point in time 0.5 seconds before the time of receipt of input operation. It is noted that, if the object moves in an excessively wide range during this period of time of one second, it is highly probable that the approximate curve cannot be obtained. Accordingly, if the amount of movement exceeds, for example, an amount corresponding to coordinate values differing by "500" in either the x-axis direction or the y-axis direction, the approximate curve may be calculated with respect to points within the range corresponding to the amount corresponding to the coordinate values differing by "500."

FIGS. 13 to 16 are diagrams illustrating an outline of the process of obtaining the approximate curve of the object path.

As shown in FIG. 13, the object path information occurring during the target time period of calculation consists of points, "P0, P1, . . . , Pn." As shown in FIG. 14, based on the coordinate values, "(x0, y0), (x1, y1), . . . , (xn, yn)," a Bezier curve is obtained.

The Bezier curve is an N−1 th degree curve which can be obtained from N numbers of control points. When the control points are "P0, P1, . . . , Pn," the Bezier curve can be represented by the following formulas.

$$P'(t)=\Sigma\{i=0,n\}P_i J_{ni}(t),$$

where $0 \leq t \leq 1$

P' (t) indicates a point on the approximate curve.

And $J_{ni}(t)$ is represented by the following formulas.

$$J_{ni}(t) = {}_nC_i t^i (1-t)^{n-1}$$

$${}_nC_i = n!/i!(n-1)!$$

Alternatively, instead of the Bezier curve, an interpolation curve such as a spline curve or another kind of approximate curve may be obtained.

(14) It is determined whether the calculated approximate curve is similar to the actual path of the object (step S39). For example, based on the determination results of whether the distances between positions on the calculated approximate curve and the respective positions of the object in the past object path information exceed a predetermined limit value, only when none exceeds the limit value, or when the average does not exceed the limit value, the calculated approximate curve is determined to be similar to the actual path of the object.

When the calculated approximate curve is not similar to the actual path of the object, the process proceeds to overall determination (step S46).

(15) A anticipated path is obtained. Specifically, the approximate curve is extended in the moving direction of the object such that the extended portion bends in the same manner as the approximate curve, and the extended portion is determined as the anticipated path (step S40).

First the slope of the approximate curve at Pn is obtained. In the case of the Bezier curve, the slope "a" of the approximate curve at Pn is identical to that of a straight line connecting Pn and P[n−1]. Accordingly, the slope a of the approximate curve at Pn can be represented by the following formula.

$$a = (xn - x[n-1])/(yn - y[n-1])$$

Next, as shown in FIG. 15, a straight line A perpendicular to the approximate curve through Pn is obtained.
The straight line A can be represented by the following formula.

$$y = -1/a(x - xn) + yn$$

Then, as shown in FIG. 16, a curve B' which is symmetrical to the Bezier curve B about the straight line A, is obtained, and the curve B' is determined as the anticipated path (thick line in FIG. 16).

Alternatively, in step S37, an approximate curve which has a given curvature may be calculated. Then, in step S38, the approximate curve may be extended at the same curvature in the moving direction of the object and the extended portion may be determined as the anticipated path.

(16) The speed of the object on the approximate curve is calculated (step S41).

A length L (t) between P0 and Pt of the Bezier curve can be represented by the following formula.

$$L(t) = \int \{0 \text{ to } t\} \sqrt{((dx/dt)^2 + (dy/dt)^2)} dt$$

The speed per second can be obtained by dividing L (t) by the elapsed time (1.5 seconds−0.5 seconds=1 second, in this case).

(17) By using the obtained speed, coordinate values (X, Y) on the anticipated path which correspond to the time of receipt of input operation are calculated (step S42).

(18) The calculated coordinate values (X, Y) on the anticipated path which correspond to the time of receipt of input operation are compared with the input position information received from the input analyzing section 15, and, based on the distance between the coordinate values on the anticipated path and the input position, the score indicating the degree of approximation of the object is calculated (step S43). The method for calculating the score indicating the degree of approximation is similar to that in the description of step S31.

(19) By comparing the calculated degree of approximation with an upper threshold value, it is determined whether these are close to each other (step S44). For example, if the score indicating the degree of approximation is greater than or equal to 60, it is determined that the calculated degree of approximation is close to the upper threshold value.

(20) When it has been determined that the calculated degree of approximation is close to the upper threshold value (Yes in step S44), the object which is a processing target is determined as a candidate for the object designated by the user (step S45), and the process proceeds to the step for the next object (step S21).

(21) When it has been determined that the calculated degree of approximation is not close to the upper threshold value (No in step S44), the degrees of similarity are compared among the past path determination (step S31); the anticipated path determination based on the approximate straight-line (step S35); and the anticipated path determination based on the approximate curve (step S43), and the degree of approximation with the highest score is selected (step S46).

(22) By comparing the selected degree of approximation with a lower threshold value, it is determined whether these are close each other (step S47). For example, if the score indicating the degree of approximation is greater than or equal to 50, it is determined that the selected degree of approximation is close to the lower threshold value.

When it has been determined that the selected degree of approximation is not close to the lower threshold value (No in step S47), no further step is followed and the process proceeds to the step for the next object (step S21).

(23) When it has been determined that the selected degree of approximation is close to the lower threshold value (Yes in step S47), the object which is the processing target is determined as a candidate for the object designated by the user (step S48), and the process proceeds to the step for the next object (step S21).

(24) Processes similar to those described in (8) referring to FIG. 6 are performed (step S28).

[Second Modification]

The present modification is another example of the method of estimating the anticipated path and the determination algorithm which includes a process of estimating the anticipated path performed in the determination section 17 according to the first embodiment.

<Detailed Description of a Method 3 for Estimating the Anticipated Path>

A method 3 for estimating the anticipated path performed in the determination section 17 will be described below.

In the method 3 for estimating the anticipated path, the approximate straight-line is calculated based on the past object path information, and the effectiveness of the approximate straight-line is evaluated. Only when the effectiveness has been verified, the approximate straight-line is extended in the moving direction of the object, and the extended portion is determined as the anticipated path in a manner similar to that in the method 1 according to the first embodiment. When the effectiveness has not been verified, a repeat pattern is detected based on the past path information of the object. Then, the portion extended in the moving direction of the object based on the repeat pattern, is determined as the anticipated path.

In the above determination algorithm according to the second modification, as in a manner similar to that according to the first modification, determination based on the past path of the object is performed before determination based on the anticipated path. When no appropriate object is found, the anticipated path determination is performed, and further determination based on the repeat pattern is performed.

FIGS. 17 and 18 are diagrams illustrating a procedure of a determination algorithm which includes a process of estimating a anticipated path performed in the determination section 17, the procedure corresponding to the subroutine of step S15 in the procedure of the object selecting process shown in FIG. 5. Those steps which perform processes similar to those in FIG. 6 of the first embodiment and FIGS. 11 and 12 of the first modification, are denoted by the same step numbers, and detailed descriptions thereof are omitted.

(1) to (12) Processes similar to those described in (1) to (12) referring to FIG. 11 are performed (steps S21 to S22, S31 to S33, S23, S34, S24 to S25, and S35 to S37).

(13) When it has been determined that the calculated degree of approximation is not close to the upper threshold value (No in step S36), a moving pattern of the object is detected based on the past path information of the object (step S51).

Here, the moving pattern is detected with respect to the certain period of time prior to the point in time shortly before the time of receipt of input operation represented by the input time information. In the present modification, the moving pattern is detected with respect to the period of time several tens of seconds before the point in time 0.5 seconds before the time of receipt of input operation.

FIG. 19 is a diagram illustrating an outline of a process of detecting the moving pattern based on the object path.

Starting from the time 0.5 seconds before the time of receipt of input operation, similar patterns which are repeated are detected in reverse chronological order.

As show in FIG. 19, in the case where a content of, for example, a car running on a circuit, a repeat pattern in which the content runs around substantially the same course at substantially the same timing, is detected.

(14) It is determined whether the moving pattern has been detected (step S52).

When the moving pattern has not been detected, no further process is followed and the process proceeds to the overall determination (step S55).

(15) When the moving pattern has been detected (Yes in step S52), a anticipated path is determined (step S53).

Based on the detected moving pattern, the path of the object after a predetermined period of time, is anticipated, thereby determining the anticipated path.

(15) The coordinate values on the anticipated path which correspond to the time of receipt of input operation are calculated (step S54).

(16) to (18) Processes similar to those described in (18) to (20) referring to FIGS. 11 and 12 are performed (steps S43 to S45).

(19) When it has been determined that the calculated degree of approximation is not close to the upper threshold value (No in step S44), the degrees of similarity are compared among the past path determination (step S31); the anticipated path determination based on the approximate straight-line (step S35); and the anticipated path determination based on the repeat pattern (step S43), and the degree of approximation with the highest score is selected (step S55).

(20) to (22) Processes similar to those described in (22) to (24) referring to FIGS. 11 and 12 are performed (steps S47 to S48, and S28).

As the determination algorithm in the determination section 17, the anticipating processes for determining the anticipated path according to the first embodiment and respective modifications, may be used solely, or two or more processes may be used in combination, as appropriate. For example, the anticipating process for determining the anticipated path based on the approximate curve according to the first modification, and the anticipating process for determining the anticipated path based on the repeat pattern according to the second modification, may be used solely or in combination, as appropriate. Alternatively, for example, a combination of all of: the determination process for determining the anticipated path based on the approximate straight-line according to the first embodiment; the determination process for determining the anticipated path based on the approximate curve according to the first modification; and the determination process for determining the anticipated path based on the repeat pattern may be used. Then, all objects detected in the respective determination processes may be determined as the object designated by the user, or based on errors of approximation used as an index, only the determination process which employs the most likely anticipated path may be used to detect the object.

<Summary>

As described above, with the configuration according to the present embodiment, it is possible, in the case where an object moves in the screen, to estimate the position at which the user would anticipate the object would be based on the past path of the object which user had seen. Regardless of the actual position of the object at the time of the input operation performed by the user, the object which the user has attempted to select can be correctly selected.

Second Embodiment

<Outline>

The present embodiment includes, in addition to the object selection executing system 1 according to the first embodiment, a configuration which allows the user to select an object by presenting candidate objects.

<Configuration>

FIG. 20 is a diagram illustrating an outline of an object selection executing system 2 according to a second embodiment. The components which perform the processes similar to those of the object selection executing system 1 shown in FIG. 1 according to the first embodiment, are denoted by the same reference numerals, and detailed descriptions thereof are omitted.

The object selection executing system 2 shown in FIG. 20 includes an object selecting apparatus 20, and the display device 19.

As shown in FIG. 20, in a manner similar to that of the object selecting apparatus 10 according to the first embodiment, the object selecting apparatus 20 is an apparatus which allows the user to select an object in a video image displayed on the screen of the display device 19; executes a predetermined process with respect to the selected object; and includes the video obtaining section 11, the video processing section 12, the video storing section 13, the operation input section 14, the input analyzing section 15, the video analyzing section 16, the determination section 17, the execution section 18, and the interface (not shown) for connecting with the display device 19. The object selecting apparatus 20 further includes a presentation section 21 and a selection receiving section 22.

The presentation section 21 causes, when one or more objects have been determined by the determination section 17 as the object designated by the user, the display device 19 to present images and/or brief description of the candidate objects for selection, and urges the user to select one or more from among the one or more candidate objects.

The selection receiving section 22 receives, from among the one or more candidate objects caused to be presented by the presentation section 21, a selection of the object(s) selected by the user.

The execution section 18 performs a predetermined process with respect to the selected one or more objects of which selection has been received by the selection receiving section 22, and causes the display device 19 to display the process result.

<Operation>

FIG. 21 is a diagram illustrating a procedure of an object selecting process in the object selection executing system 2 according to the present embodiment.

The steps which perform processes similar to those in FIG. 5 according to the first embodiment, are denoted by the same step numbers, and detailed descriptions thereof are omitted.

(1) to (14) Processes similar to those described in (1) to (14) referring to FIG. 5 are performed (steps S1 to S14).

(15) Based on the one or more groups containing the input position information and the input time information received from the input analyzing section 15; and on the object path information received from the video analyzing section 16, the determination-section 17 determines one or more candidates for the object which the user has attempted to select by using a single determination algorithm or a combination of determination algorithms, and sends a determination result to the presentation section 21 (step S61). The determination section 17 performs no operation in this example if it has received a notice that there is no object path information from the video analyzing section 16.

(16) Processes similar to those described in (16) referring to FIG. 5 are performed (step S16).

(17) If at least one object has been identified, the presentation section 21 causes the display device 19 to present images and/or brief description of the candidate object(s) for selection and urges the user to select one or more from among the one or more candidate objects (step S62).

(18) The selection receiving section 22 receives, a selection of the object(s) selected by the user from among the one or more candidate objects caused to be presented by the presentation section 21 (step S63). When the user cancels and no object is selected, no process is performed here.

(19) The execution section 18 executes a predetermined process with respect to the selected object(s) of which selection has been received by the selection receiving section 22 (step S64).

(20) Processes similar to those described in (18) referring to FIG. 5 are performed (step S18).

Features of the selecting operation of the respective users may be extracted and learned, and fed back to the next round of the determination process and the rounds after that. Specifically, for example, one user has a feature that he/she tends to select an object relatively slower than the motion of the object, and another user has a feature that he/she tends to select an object based on the anticipated motion of the object. By extracting these features, the determination algorithm may be changed according to the respective users, or the priorities of the determination algorithms may be changed. For example, in the case of a user who tends to select an object based on the anticipated motion of the object, determination is performed based only on an algorithm which anticipates the path of the object. Further, in the determination section 17, a plurality of algorithms may be used in combination, the algorithms being such as: an algorithm which anticipates the path of the object, and an algorithm which determines the degree of resemblance of the path shapes at different times while gradually shifting time. More specifically, the determination results of the plurality of algorithms are calculated, and the respective determination results are multiplied by an adjusting coefficient, and the sum of the adjusted determination results may be determined as the final determination result. For example, in the case of the user who tends to select the object based on the anticipated motion of the object, the determination accuracy can be increased by setting the coefficients of the algorithm which anticipates the path of the object, higher than other coefficients.

FIG. 22 is a diagram illustrating a case where a user anticipates a motion of the vehicle A and touches a touch panel. In FIG. 22, the vehicle A has moved from the upper left portion to the central portion of the screen toward the lower right portion of the screen. The user anticipates a destination of the vehicle A based on the moving direction and the speed of the vehicle A (dotted line in FIG. 22), and attempts to select the vehicle A by touching the lower right portion of the screen of the touch panel. In the actual video image, however, against the user's anticipation, the vehicle A changes the moving direction and moves downward from the central portion of the screen. In this case, a conventional apparatus does not select the vehicle A. On the contrary, the object selecting apparatus according to the present invention can anticipate the destination of the vehicle A in a manner similar to the user, and thus can select the vehicle A, which the user has attempted to select, as the target object.

<Summary>

As described above, the configuration according to the present embodiment has an effect similar to that according to the first embodiment. In addition, because the user selects the object(s) from the presented candidates for selection, the object, which the user has attempted to select, can be correctly selected.

The above embodiment also can be realized by causing a CPU to execute a program which can cause the CPU to execute the procedures stored in a storage device (a ROM, a RAM, a hard disk or the like). In this case, the program may be stored in the storage device via a recording medium and executed, or may be executed directly from the recording medium. The recording medium herein may be a semiconductor memory such as a ROM, a RAM, or a flash memory; a magnetic disk memory such as a flexible disk or a hard disk; an optical disk such as a CD-ROM, a DVD, or a BD; or a recording medium such as a memory card. The recording medium includes a communication medium such as a phone line or a carrier channel.

In the above described embodiments according to the present invention, the video processing section 12, the video storing section 13, the input analyzing section 15, the video analyzing section 16, and the determination section 17 are realized as LSIs which are integrated circuits. Alternatively, these sections may each be realized as a single chip, or these sections may be partly or entirely realized as a single chip. For example, the components relating to video images (the video processing section 12, the video storing section 13) and the components relating to input and analysis (the input analyzing section 15, the video analyzing section 16, the determination section 17) may each be realized as a single LSI chip. These LSI chips may be referred to as ICs, system LSIs, super LSIs, or ultra LSIs depending on the degree of integration.

Further, the method of integration is not limited to the LSI, and may be realized as a dedicated circuit or a general purpose processor. Alternatively, an FPGA (Field Programmable Gate Array), which is programmable after manufacturer of the LSI; or a reconfigurable processor, which can configure setting and connection of circuit cells inside the LSI, may be used.

If a new technology replacing the LSI arises as a result of an improvement of the semiconductor technology or another technology derived therefrom, naturally, the function blocks may be integrated using such a technology. Adoption of biotechnology or the like may be one possibility.

The communication system incorporating the present invention takes the form of an adaptor, which converts a signal interface such as an Ethernet (registered trademark) interface, IEEE 1394 interface, or USB interface into an interface for a power line communication, thereby connecting with a multimedia apparatus such as a personal computer, a DVD recorder, a digital television, and a home server system, which includes various interfaces. Accordingly, it is possible to build a network system capable of high-speed transmission of digital data such as multimedia data via a power line. Unlike a conventional wired LAN, there is no need to newly lay a network cable because the existing power lines in homes, offices, or the like may be used as a network line, which realizes a lower cost and ease of installation. Thus this communication system is highly convenient.

In the future, incorporation of the present invention into a multimedia apparatus such as a personal computer, a DVD recorder, a digital television, and a home server system, enables data transmission between multimedia apparatuses via power cords thereof. In such a case, wiring is simplified because there is no need for an adaptor, Ethernet (registered trademark), cable, IEEE 1394 cable, and USB cable. The multimedia apparatus can be connected to the Internet via a router, and connected to a wireless LAN or conventional wired LAN via a hub or the like. Thus there is no problem in extending the LAN system in which the high-speed power line transmission system according to the present invention is used.

Unlike a wireless LAN, the power line transmission system transmits communication data via the power line, causing no problem of data leakage due to interception of a radio wave. Therefore, the power line transmission system is effective for data protection in terms of security. It is understood that data transmitted via the power line are protected by, for example, IPsec in IP protocol, encrypted contents, or other DRM (Digital Rights Management) systems.

As described above, it is possible to transmit high-quality AV contents using the power line by implementing a QoS (Quality of Service) function including a copyright protection function such as encrypting contents, or the effects of the present invention (throughput enhancement, band allocation flexibly responding to increase in retransmission and traffic change).

While the present invention has been described in detail, the foregoing description is in all aspects illustrative and not restrictive. It is understood that numerous other modifications and variations are possible within the scope of the present invention.

INDUSTRIAL APPLICABILITY

The object selecting apparatus according to the present invention is applicable to any device which displays images, and can be used as an extended function for various kinds of recorder/player such as a DVD recorder, blu-ray recorder, or an HDD recorder; a display device such as a digital television; a personal computer or the like. The object selecting apparatus according to the present invention allows the user to select a desired object intuitively and without feeling uncomfortable, and thus is highly valuable in industry.

DESCRIPTION OF THE REFERENCE CHARACTERS 1 object selection executing system
2 object selection executing system
10 object selecting apparatus
11 video obtaining section
12 video processing section
13 video storing section
14 operation input section
15 input analyzing section
16 video analyzing section
17 determination section
18 execution section
19 display device
20 object selecting apparatus
21 presentation section
22 selection receiving section

The invention claimed is:

1. An object selecting apparatus for allowing a user to select an object in a video image, the apparatus comprising:
a processor;
a video processing section which causes an external display device to display a video image;
a storage device which stores data of the video image caused to be displayed by the video processing section;
an input section which receives an input operation by which the user attempts to designate a display position of an object in the video image displayed on the display device;
an input analyzing section which generates, when the input operation is received by the input section, time information indicating a time of receipt and position information indicating an inputted position in the video image;
a video analyzing section which extracts, using the processor, one or more objects in the video image based on the data of the video image stored in the storage device, which analyzes one or more paths of the respective one or more objects, and which generates, with respect to each of the one or more objects, path information indicating a path history of the object; and
a determination section which, with respect to each of the one or more objects, performs anticipated path determination which: estimates an anticipated path, on which the user would anticipate that the object might be displayed at around the time of receipt indicated by the time information outputted by the input analyzing section, based on the path information occurring during a certain period of time prior to a point in time which is the start of a predetermined period of time before the time of receipt, the certain period of time excluding the time of receipt; compares an anticipated position on the anticipated path, which anticipated position corresponds to the time of receipt, with the position information generated by the input analyzing section; and determines, when the distance between the anticipated position and the position information is in a predetermined range, the object, which is a close object, as the object selected by the user.

2. The object selecting apparatus according to claim 1, wherein
the determination section generates, with respect to each of the one or more objects, an approximate straight-line of a path of the object based on the path information occurring during the certain period of time; extends the approximate straight-line in the moving direction of the object; and determines the extended portion as the anticipated path.

3. The object selecting apparatus according to claim 2, wherein
the determination section determines, with respect to each of the one or more objects, whether the distances between positions on the approximate straight-line and respective positions of the object in the path history exceed a predetermined limit value; and only when the distances do not exceed the limit value, estimates the anticipated path based on the approximate straight-line.

4. The object selecting apparatus according to claim 3, wherein
the determination section calculates, with respect to each of the one or more objects, when the distances exceed the limit value, an approximate curve for the object based on the path information occurring during the certain period of time; extends the approximate curve in the moving direction of the object; and determines the extended portion as the anticipated path.

5. The object selecting apparatus according to claim 3, wherein
the determination section calculates, with respect to each of the one or more objects, when the distances exceed the limit value, an approximate curve for the object based on the path information occurring during the certain period of time; extends the approximate curve in the moving direction of the object at the same curvature as the approximate curve; and determines the extended portion as the anticipated path.

6. The object selecting apparatus according to claim 3, wherein
the determination section detects, with respect to each of the one or more objects, when the distances exceed the limit value, a moving pattern of the object based on the path information occurring during the certain period of time; anticipates a path of the object after the point in time which is the start of the predetermined period of time based on the moving pattern; and determines the path having been anticipated as the anticipated path.

7. The object selecting apparatus according to claim 1, wherein
the determination section calculates, with respect to each of the one or more objects, the moving speed of the object based on the path information occurring during the certain period of time; and determines, as the anticipated position, the position to which the object has moved during the predetermined period of time from the position at the point in time which is the start of the predetermined period of time, while maintaining the constant speed based on the moving speed of the object.

8. The object selecting apparatus according to claim 1, wherein
the determination section calculates, with respect to each of the one or more objects, the rate of change of speed of the object based on the path information occurring during the certain period of time; and determines, as the anticipated position, the position to which the object has moved during the predetermined period of time from the position at the point in time which is the start of the predetermined period of time, while changing the speed based on the rate of change of speed.

9. The object selecting apparatus according to claim 1, further comprising:
a presentation section which, when the determination section has determined one or more objects as the object designated by the user, presents one or more candidate objects for selection, and urges the user to select one or more from among the one or more candidate objects;

a selection receiving section which receives, from the user, a selection of the one or more from among the one or more candidate objects presented by the presentation section; and an execution section which executes a predetermined process with respect to each of the one or more of which selection has been received by the selection receiving section, and which causes the external display device to display a result of the process.

10. A non-transitory computer-readable medium having a program stored thereon which is executed by an object selecting apparatus for allowing a user to select an object in a video image, the program causing the object selecting apparatus to execute:

a video processing step of causing an external display device to display a video image;

a storing step of storing data of the video image caused to be displayed in the video processing step;

an inputting step of receiving an input operation by which the user attempts to designate a display position of an object in the video image displayed on the display device;

an input analyzing step of generating, when the input operation is received in the inputting step, time information indicating a time of receipt and position information indicating the inputted position in the video image;

a video analyzing step of extracting one or more objects in the video image based on the data of the video image stored in the storing step, of analyzing one or more paths of the respective one or more objects, and of generating, with respect to each of the one or more objects, path information indicating a path history of the object; and a determination step of, with respect to each of the one or more objects, performing anticipated path determination which: estimates an anticipated path, on which the user would anticipate that the object might be displayed at around the time of receipt indicated by the time information outputted by the input analyzing section, based on the path information occurring during a certain period of time prior to a point in time which is the start of a predetermined period of time before the time of receipt, the certain period of time excluding the time of receipt; compares an anticipated position on the anticipated path, which anticipated position corresponds to the time of receipt, with the position information generated by the input analyzing section; and determines, when the distance between the anticipated position and the position information is in a predetermined range, the object, which is a close object, as the object selected by the user.

11. An integrated circuit to be used in an object selecting apparatus for allowing a user to select an object in a video image, the integrated circuit functioning as:

a video processing section which causes an external display device to display a video image;

a storage section which stores data of the video image caused to be displayed by the video processing section;

an input section which receives an input operation by which the user attempts to designate a display position of an object in the video image displayed on the display device;

an input analyzing section which generates, when the input operation is received by the input section, time information indicating a time of receipt and position information indicating an inputted position in the video image;

a video analyzing section which extracts one or more objects in the video image based on the data of the video image stored in the storage section, which analyzes one or more paths of the respective one or more objects, and which generates, with respect to each of the one or more objects, path information indicating a path history of the object; and a determination section which, with respect to each of the one or more objects, performs anticipated path determination which: estimates an anticipated path, on which the user would anticipate that the object might be displayed at around the time of receipt indicated by the time information outputted by the input analyzing section, based on the path information occurring during a certain period of time prior to a point in time which is the start of a predetermined period of time before the time of receipt, the certain period of time excluding the time of receipt; compares an anticipated position on the anticipated path, which anticipated position corresponds to the time of receipt, with the position information generated by the input analyzing section; and determines, when the distance between the anticipated position and the position information is in a predetermined range, the object, which is a close object, as the object selected by the user.

12. An object selecting method used in an object selecting apparatus for allowing a user to select an object in a video image, the object selecting method comprising:

a video processing step of causing an external display device to display a video image;

a storing step of storing data of the video image caused to be displayed in the video processing step;

an inputting step of receiving an input operation by which the user attempts to designate a display position of an object in the video image displayed on the display device;

an input analyzing step of generating, when the input operation is received in the inputting step, time information indicating a time of receipt and position information indicating an inputted position in the video image;

a video analyzing step of extracting one or more objects in the video image based on the data of the video image stored in the storing step, of analyzing one or more paths of the respective one or more objects, and of generating, with respect to each of the one or more objects, path information indicating a path history of the object; and a determination step of, with respect to each of the one or more objects, performing anticipated path determination which: estimates an anticipated path, on which the user would anticipate that the object might be displayed at around the time of receipt indicated by the time information outputted by the input analyzing section, based on the path information occurring during a certain period of time prior to a point in time which is the start of a predetermined period of time before the time of receipt, the certain period of time excluding the time of receipt; compares an anticipated position on the anticipated path, which anticipated position corresponds to the time of receipt, with the position information generated by the input analyzing section; and determines, when the distance between the anticipated position and the position information is in a predetermined range, the object, which is a close object, as the object selected by the user.

13. The object selecting apparatus according to claim 1, wherein the determination section:
  performs, with respect to each of the one or more objects, before performing the anticipated path determination, past path determination which: compares, based on the path information occurring during the certain period of time prior to the point in time which is the start of the predetermined time before the time of receipt indicated by the time information outputted by the input analyzing section, a past path based on an actual movement of the object with the position information generated by the input analyzing section; and determines, when the distance between the past path and the position information is in a predetermined range, the object, which is a close object, as the object selected by the user; and
  performs, when there is no close object found during the past path determination, the anticipated path determination.

14. The non-transitory computer-readable medium according to claim 10, wherein the determination step includes:
  performing, with respect to each of the one or more objects, before performing the anticipated path determination, past path determination which: compares, based on the path information occurring during the certain period of time prior to the point in time which is the start of the predetermined time before the time of receipt indicated by the time information outputted by the input analyzing section, a past path based on an actual movement of the object with the position information generated by the input analyzing section; and determines, when the distance between the past path and the position information is in a predetermined range, the object, which is a close object, as the object selected by the user; and
  performing, when there is no close object found during the past path determination, the anticipated path determination.

15. The integrated circuit to be used in an object selecting apparatus according to claim 11, wherein the circuit functioning as the determination section:
  performs, with respect to each of the one or more objects, before performing the anticipated path determination, past path determination which: compares, based on the path information occurring during the certain period of time prior to the point in time which is the start of the predetermined time before the time of receipt indicated by the time information outputted by the input analyzing section, a past path based on an actual movement of the object with the position information generated by the input analyzing section; and determines, when the distance between the past path and the position information is in a predetermined range, the object, which is a close object, as the object selected by the user; and
  performs, when there is no close object found during the past path determination, the anticipated path determination.

16. The object selecting method according to claim 12, wherein the determination step includes:
  performing, with respect to each of the one or more objects, before performing the anticipated path determination, past path determination which: compares, based on the path information occurring during the certain period of time prior to the point in time which is the start of the predetermined time before the time of receipt indicated by the time information outputted by the input analyzing section, a past path based on an actual movement of the object with the position information generated by the input analyzing section; and determines, when the distance between the past path and the position information is in a predetermined range, the object, which is a close object, as the object selected by the user; and
  performing, when there is no close object found during the past path determination, the anticipated path determination.

* * * * *